US006987368B2

(12) United States Patent
Yamasaki et al.

(10) Patent No.: US 6,987,368 B2
(45) Date of Patent: Jan. 17, 2006

(54) MOTOR CONTROLLER

(75) Inventors: Hirokazu Yamasaki, Osaka (JP); Koji Kameda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 57 days.

(21) Appl. No.: 10/781,203

(22) Filed: Feb. 18, 2004

(65) Prior Publication Data

US 2005/0012476 A1  Jan. 20, 2005

(30) Foreign Application Priority Data

| Jul. 16, 2003 | (JP) | ............................. 2003-197563 |
| Jul. 16, 2003 | (JP) | ............................. 2003-197564 |
| Jul. 16, 2003 | (JP) | ............................. 2003-197565 |
| Jul. 16, 2003 | (JP) | ............................. 2003-197566 |

(51) Int. Cl.
*H02P 7/00* (2006.01)

(52) U.S. Cl. .................. 318/105; 318/440; 318/34; 318/254; 318/138; 318/439; 307/18

(58) Field of Classification Search ............... 318/105, 318/34, 254, 138, 439, 440; 307/18
See application file for complete search history.

(56) References Cited

U.S. PATENT DOCUMENTS 4,855,734 A * 8/1989 Elsdoerfer ............. 340/870.31
5,663,616 A * 9/1997 Stringfellow et al. ....... 318/254
5,815,089 A * 9/1998 Katagiri et al. ........ 340/870.03
6,243,023 B1 * 6/2001 Katagiri ................. 340/870.03

FOREIGN PATENT DOCUMENTS

| JP | 04-251586 | 9/1992 |
| JP | 05-119020 | 4/1994 |
| JP | 07-322668 | 12/1995 |
| JP | 08-168283 | 6/1996 |
| JP | 10-206187 | 8/1998 |
| JP | 2000-031707 | 1/2000 |
| JP | 2000-270584 | 9/2000 |
| JP | 2000-324880 | 11/2000 |

* cited by examiner

*Primary Examiner*—Rita Leykin
(74) *Attorney, Agent, or Firm*—RatnerPrestia

(57) ABSTRACT

A motor controller includes a position sensing device having a position sensor that senses a magnetic pole of a motor, a driver for driving the motor, and a wiring section that feeds a power supply voltage from the driver to the position sensing device. The position sensing device is equipped with a superposed-wave transmitter coupled to a first end of the wiring section and a serial converter for converting a signal of the sensing device into a serial signal. The driver is equipped with a superposed-wave receiver coupled to a second end of the wiring section and a parallel converter for converting the serial signal into a parallel signal. The foregoing structure allows superposing the information about switching a phase-excitation for driving the motor onto the wiring section formed of a pair of cables, i.e. two cables, so that the information is transmitted.

52 Claims, 21 Drawing Sheets

MOTOR CONTROLLER

FIELD OF THE INVENTION

The present invention relates to a motor controller which transmits information about switching a phase excitation of the motor employed in a variety of transporting apparatuses such as robots and conveyors for industrial use.

BACKGROUND OF THE INVENTION

Brush-less motors are widely used in the market. The brush-less motor has a permanent magnet on the rotor side, and a position sensor senses a magnetic pole of the permanent magnet for switching a phase excitation, thereby driving the brush-less motor. A controller of the brush-less motor is formed of two major sections: one is a position sensor for sensing a rotational position of the rotor, and the other one is a driver for driving the motor. FIG. 22 shows a structure of a conventional motor controller.

In FIG. 22, driver 602 includes dc power supply 615, which powers position sensor 603 via wiring section 616. Power incoming section 617 works as a power supply for position sensor 603, which is equipped with position sensors (e.g. Hall IC) 611, 612, 613 sensing a magnet pole position of the rotor of motor 610 and outputting a phase-excitation switching signal. Driver 602 includes inverter circuit 690 which powers respective phase-coils of motor 610, and power switching circuit 680 which controls power-switching of inverter circuit 690. Wiring section 616 is formed of five electrical cables in total, i.e. two power cables and three signal cables. Wiring section 616 wires position sensor 603 to driver 602.

Inverter circuit 690, having six power transistors, is powered by dc power supply 629 and coupled to three-phase motor 610 via cables U, V, W.

Hall ICs 611, 612, 613 sense a magnetic pole position of the rotor of motor 610 and output phase-excitation switching signals CS1, CS2, CS3 respectively. Those signals are supplied to driver 602 via wiring section 616, and in general, they have a phase difference of 120 degrees in electric angles from each other and are output in the form of rectangular pulse.

Signals CS1, CS2, CS3 supplied to driver 602 are fed into power-switching circuit 680 via buffer circuits 681, 682, 683 respectively. Power-switching circuit 680 produces a signal which switches a powering and a phase-excitation of respective phase-coils of motor 610, and outputs powering signals UH, VH, WH, UL, VL, WL of the six power transistors of inverter circuit 690 in the form of rectangular pulse.

FIG. 23 shows waveforms of the brush-less motor being driven by the rectangular-pulse driving method. Power-switching circuit 680 produces a power signal for the six power transistors based on phase-excitation switching signals CS1, CS2, CS3 supplied from Hall ICs 611, 612, 613. This power signal drives inverter circuit 690 to perform switching operation. As a result, a current shaping like a rectangular wave such as Iu passes through, e.g. cable U.

In the foregoing prior art, the phase-excitation switching signals are transmitted from the motor to the driver through three cables in parallel; however, the signals can undergo a parallel-serial conversion and are transmitted through two differential output cables. This instance is disclosed in Japanese Patent Application Non-Examined Publication No. H10-206187.

The conventional controller of the brush-less motor needs two cables for transmitting dc power supply 615 to position sensor 603, and three cables (two cables in the case of the differential output cables) for transmitting phase-excitation switching signals CS1, CS2, CS3 to driver 602. As many as five cables in total (four cables in the case of the differential output cables) are thus needed, so that a fewer cables have been required for improving efficiency of assembling the controller.

FIG. 24 shows a structure of each one of Hall ICs 611, 612, 613. As shown in FIG. 24, Hall element 636, which senses a magnetic pole position, outputs a signal, and operation amplifier 637 amplifies the signal, then open collector 638 outputs the signal amplified. In the case of a signal at logic level H, the cable cannot carry a current, so that the cable falls into a high-impedance status. The cable becomes thus vulnerable to noises, particularly when the signal needs a long distance transmission.

Use of a shielded cable is one of measures for avoiding this problem; however, it is expensive and difficult to get the shielded cable containing five cables insulated from each other. Since this idea causes time-loss and cost-increase, another idea for increasing the productivity has been required.

SUMMARY OF THE INVENTION

The present invention addresses the problem discussed above and aims to provide a motor controller having higher reliability, resistance to disturbance noises, and a fewer cables for phase-excitation switching signals.

The motor controller of the present invention comprises the following elements:
- a position sensing device including a position sensor for sensing a magnetic pole of a motor;
- a driver for driving the motor; and
- a wiring section for feeding a power supply voltage from the driver into to the position sensing device.

The position sensing device includes the following elements:
- a superposed wave transmitter coupled to a first end of the wiring section;
- a serial converter for converting a signal of the position sensor into a serial signal; and
- a sensing-device interface disposed between the serial converter and the superposed wave transmitter.

The driver includes the following elements:
- a dc power supply;
- a superposed wave receiver coupled between the dc power supply and a second end of the wiring section;
- a parallel converter for converting the serial signal into a parallel signal;
- a driver interface disposed between the superposed wave receiver and the parallel converter; and
- a power switching circuit to be driven by the parallel signal.

The serial signal is superimposed and transmitted to the wiring section, and the power switching circuit switches a phase excitation for driving the motor.

DETAILED DESCRIPTION OF PREFERRED EMBODIMENT

Exemplary embodiments of the present invention are demonstrated hereinafter with reference to the accompanying drawings.

Exemplary Embodiment 1

Figure 1:
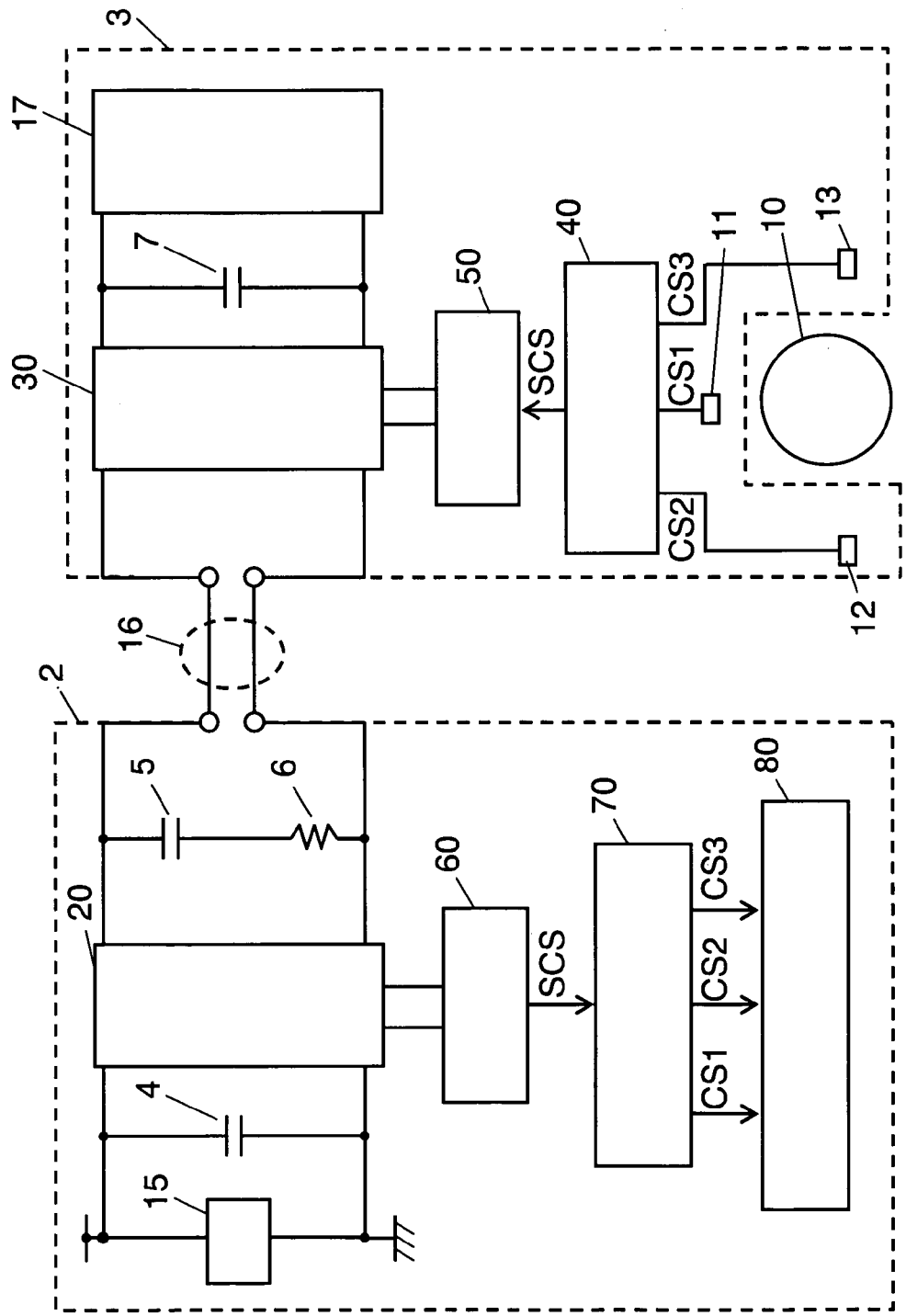
FIG. 1 shows a circuit diagram of a motor controller in accordance with a first exemplary embodiment of the present invention.

FIG. 1 illustrates a motor controller in accordance with the first exemplary embodiment of the present invention. The motor controller comprises driver 2, position sensing device 3, and wiring section 16. Driver 2 includes dc power supply 15 which powers position sensing device 3 via wiring section 16, and power incoming section 17 works as a power supply for position sensing device 3.

A brush-less motor is used as motor 10 and equipped with a rotor (not shown) having a permanent magnet. Position sensing device 3 includes position sensors (Hall ICs are used in general) 11, 12, and 13, and senses a magnetic pole of motor 10. Output signals CS1, CS2, CS3 from the Hall ICs are fed into serial converter 40, where the signals converted into serial signals, so that phase-excitation switching information SCS is obtained. Since information SCS has undergone the serial conversion, it can carry three kinds of signals CS1, CS2, CS3, which are described in the prior art, as a piece of definite information at fixed intervals. Information SCS is fed into superposed wave transmitter 30 via interface 50. Superposed wave transmitter 30 comprises a transformer or a choke coil and a capacitor, and superposes a serial signal to wiring section 16.

Driver 2 is equipped with superposed wave receiver 20, and receives phase-excitation switching information SCS superposed to wiring section 16 via interface 60. Information SCS is converted into a parallel signal by parallel converter 70, and phase-excitation switching signals CS1, CS2, CS3 are fed into power-switching circuit 80. Similar to the prior art shown in FIG. 21, power-switching circuit 80 drives motor 10 via an inverter circuit (not shown) formed of six power transistors.

In general, the power supply voltage of dc power supply 15 is 5V, which is supplied from driver 2 to power incoming section 17 of position sensing device 3 via wiring section 16 formed of two cables, namely, one cable for 5V and the other cable for 0V. These two cables are routed through superposed wave receiver 20 and transmitter 30, so that the cables encounter an inductance of the transformer or the choke coil; however, the inductance is set at such a small value that negligible influence occurs.

Before power incoming section 17, capacitor 7 of approx. 0.1 $\mu$F is placed, so that noises are prevented from invading power incoming section 17. At a tip of driver 2 working as a receiver, terminator resistor 6 having the same resistance value as a characteristic impedance of wiring section 16 is placed, so that a signal on a transmission line is prevented from reflecting. This reflection troubles the signals being transmitted at a high speed with a high frequency. Capacitor 5 is coupled to resistor 6 in series only to work on an ac component of a signal.

Use of a balanced transmission line, which is resistant to noises, can protect the signals against disturbance noises, so that the two cables of wiring section 16 can be twisted for that purpose. Further, the two cables can be shielded for protecting them against disturbance noises.

Exemplary Embodiment 2

Figure 2:
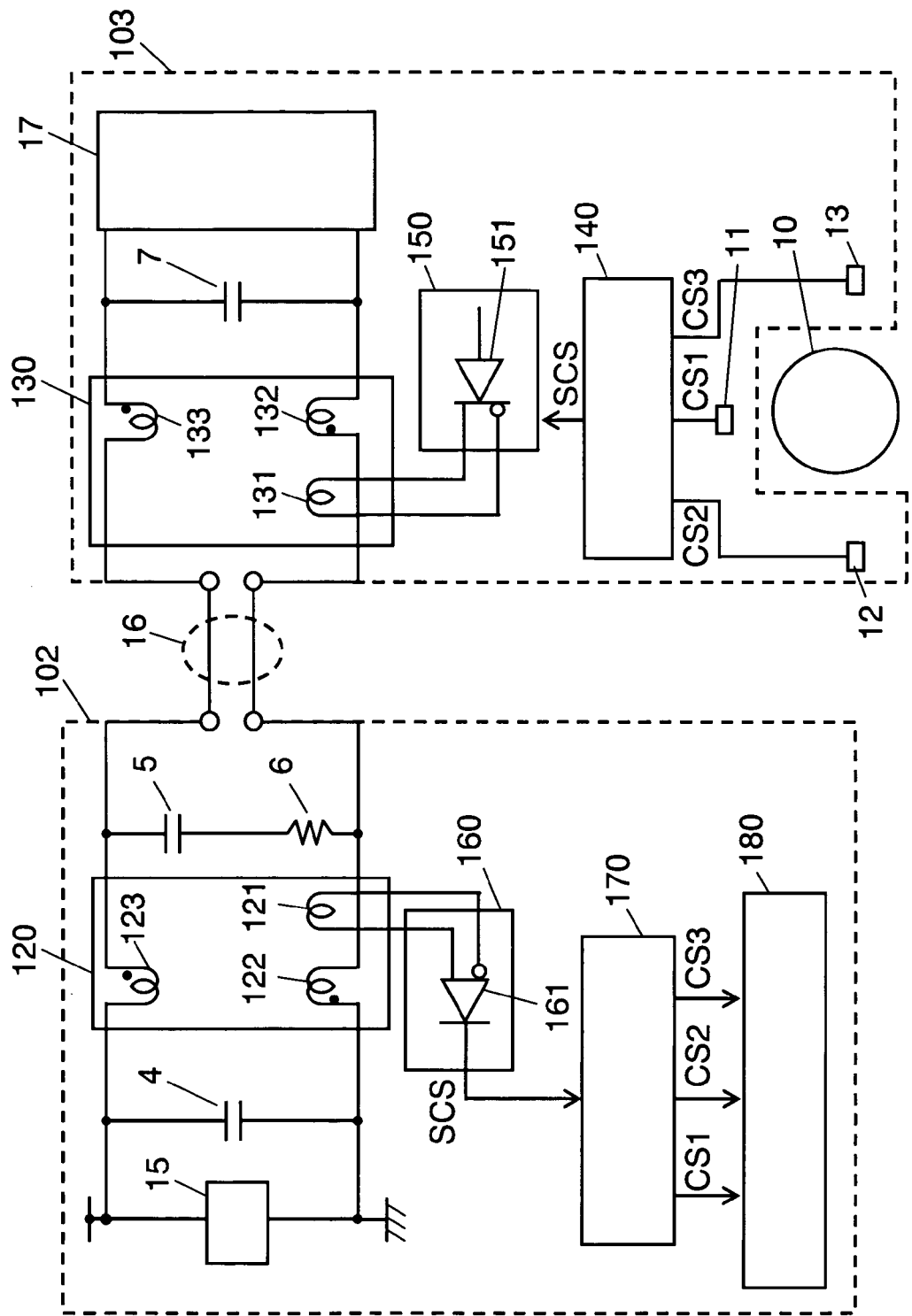
FIG. 2 shows a circuit diagram of a motor controller in accordance with a second exemplary embodiment of the present invention.

FIG. 2 illustrates a motor controller in accordance with the second exemplary embodiment of the present invention, and depicts the foregoing first embodiment more specifically.

In FIG. 2, the motor controller of the present invention comprises driver 102, position sensing device 103, and wiring section 16. Driver 102 includes dc power supply 15 which powers position sensing device 103 via wiring section 16, and power incoming section 17 works as a power supply for position sensing device 103.

Position sensing device 103 incorporates sensing-device transformer 130 that is formed of a piece of signal wire-wound section 131 and two power-supply wire-wound sections 132, 133 coupled to wiring section 16 having two cables. Driver 102 includes driver-transformer 120 that is formed of a piece of signal wire-wound section 121 and two power-supply wire-wound sections 122, 123 coupled to wiring section 16 having two cables. Transformers 130 and 120 employ respectively an SMD (surface mounted device) formed of E-type split ferrite-core of 10 mm square and a bobbin. The bobbins are wound by three wires in the range between several turns and ten and several turns. Among the three wires, one is assigned to signal wire-wound section 131 or 121, and the other two wires are assigned to power-supply wire-wound sections 132, 133 or 122, 123.

When an inductance of signal wire-wound section 131 or 121 is not large enough, a signal is not superposed exactly to wiring section 16, so that the signal cannot be transmitted. As a result, one wire assigned to signal wire-wound section 131 or 121 needs several turns greater than those of the other two wires. In this embodiment, two wires of the power-supply wire-wound sections are wound 8 turns, and the wire of the signal wire-wound section is wound 16 turns. For instance, when Manchester code of 5 Mbps (transmission rate) is used, an inductance of approx. 40 $\mu$H, which is practically needed, can be obtained.

In general, the power supply voltage of dc power supply 15 is 5V, which is supplied from driver 102 to power incoming section 17 of position sensing device 103 via wiring section 16 formed of two cables, namely, one cable for 5V and the other cable for 0V. The power supply voltage thus passes through wire-wound sections 122, 123 of transformer 120 and wire-wound sections 132, 133 of transformer 130; however, the number of turns of those wire-wound sections are so small that the power-supply voltage is affected by negligible small dc component.

Figure 18:
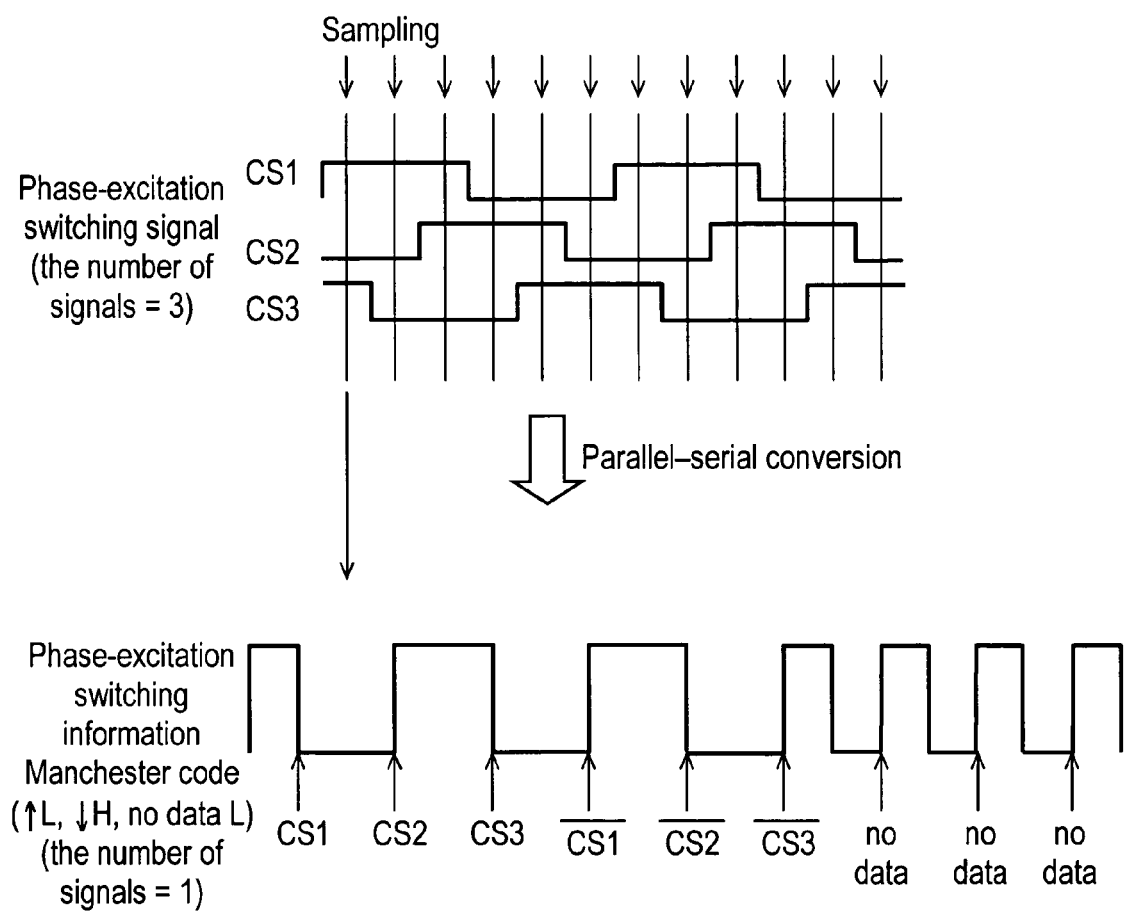
FIG. 18 illustrates a serial conversion in a motor controller of the present invention.

A brush-less motor is used as motor 10 and equipped with a rotor (not shown) having a permanent magnet. Position sensing device 103 includes position sensors (Hall ICs are used in general, and hereinafter referred to as Hall IC) 11, 12, and 13, and senses a magnetic pole of motor 10. Output signals CS1, CS2, CS3 from the Hall ICs are fed into serial converter 140, where the signals are converted into serial signals, so that phase-excitation switching information SCS is obtained. Information SCS is fed into interface 150, which incorporates line driver 151. Information SCS is differentially output by line driver 151 and transmitted to signal wire-wound section 131 of transformer 130. Since information SCS has undergone the serial conversion, it can carry three kinds of signals CS1, CS2, CS3, which are described in the prior art, as a piece of definite information at fixed intervals. FIG. 18 shows an instance of the phase-excitation switching information undergone the serial conversion.

Line driver 151 is a circuit for differential output, and an interface IC available in the market can be used for this purpose. Phase-excitation switching information SCS transmitted to signal wire-wound section 131 is superposed to power-supply wire-wound sections 132, 133 by electromagnetic induction. Information SCS superposed to wire-wound sections 132, 133 is transmitted to wire-wound sections 122, 123 of transformer 120 included in driver 102 via wiring section 16, then separated at signal wire-wound section 121 by transformer 120, and fed into interface 160 having line receiver 161. Information SCS formed of serial signals is fed into parallel converter 170, where the information is converted into a parallel form. As a result, phase-excitation switching signals CS1, CS2, CS3 are fed into power switching circuit 180. Those parallel signals are needed to control the brush-less motor. Line receiver 161 is a circuit for differential input, and an interface IC available in the market can be used for this purpose. Power switching circuit 180 drives motor 10 via an inverter circuit (not shown) formed of six power transistors.

Before power incoming section 17, capacitor 7 of approx. 0.1 $\mu$F is placed, so that noises are prevented from invading power incoming section 17. At a tip of driver 102 working as a receiver, terminator resistor 6 having the same resistance value as a characteristic impedance of wiring section 16 is placed, so that a signal on a transmission line is prevented from reflecting. This reflection troubles the signals being transmitted at a high speed with a high frequency. Terminator resistor 6 uses 100Ω which is the same value as the characteristics impedance of the cable used in this embodiment. Since a dc power supply is used in this embodiment, capacitor 5 is coupled to resistor 6 in series only to work on an ac component of a signal. Because use of only terminator resistor 6 causes resistor 6 to generate heat, and does not allow transmitting a transmission waveform.

Use of a balanced transmission line, which is resistant to noises, can protect the signals against disturbance noises, so that the two cables of wiring section 16 can be twisted for that purpose. Further, the two cables can be shielded for protecting them against disturbance noises.

Figure 3:
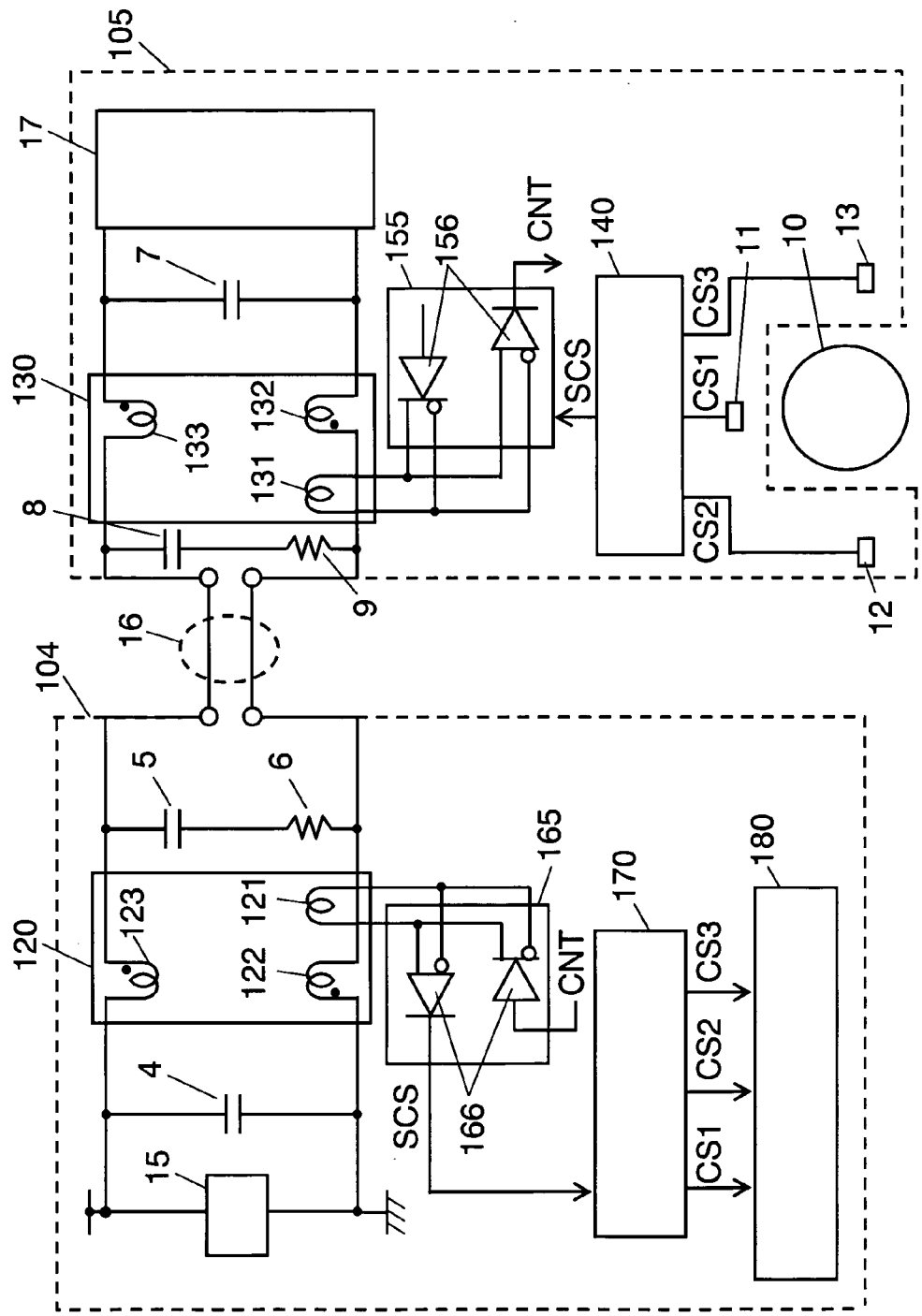
FIG. 3 shows a circuit diagram of another motor controller in accordance with the second exemplary embodiment of the present invention.

FIG. 3 illustrates another embodiment of a motor controller related to the second exemplary embodiment of the present invention, and depicts a more specific instance of the first embodiment.

In FIG. 3, interface 150 including line driver 151 and interface 160 including line receiver 161 shown in FIG. 2 are replaced with interfaces 155 and 165 including respectively transceivers 156 and 166 which can transmit and receive signals bi-directionally. Terminator resistor 9 is placed in position sensing device 105 too. Those two points are different from the embodiment shown in FIG. 2. Transceivers 156, 166 are the circuits for bi-directional differential input/output, and an interface IC available in the market can be used for this purpose.

In FIG. 3 driver 104 can transmit control signal CNT to position sensing device 105, while in FIG. 2 position sensing device 103 transmits the signal to driver 102 in only one way. Control signal CNT is needed for a sophisticated device, and transmits a reception timing of phase-excitation switching information SCS at driver 104 to position sensing device 105, thereby adjusting synchronization of the communication.

Figure 4:
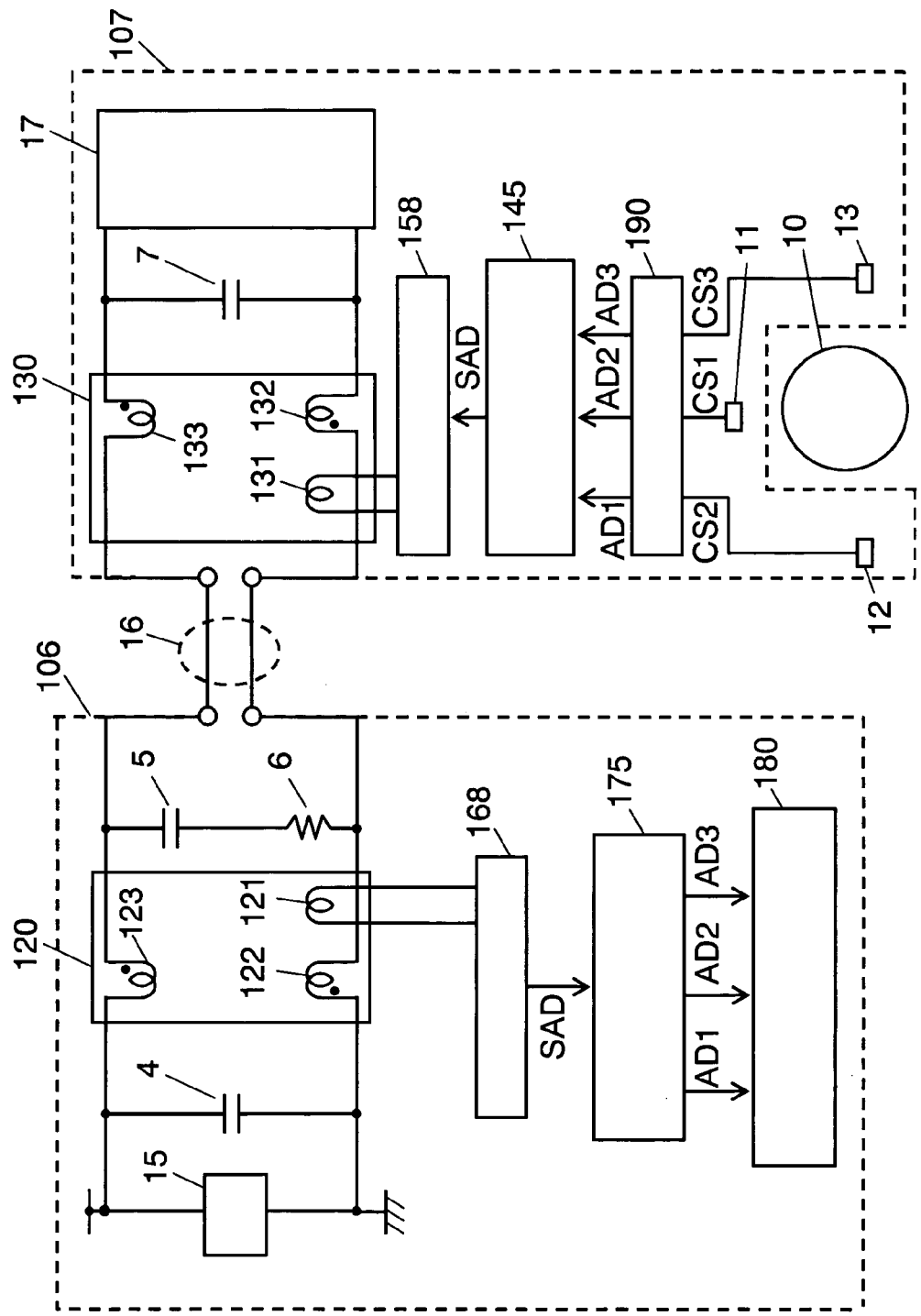
FIG. 4 shows a circuit diagram of another motor controller in accordance with the second exemplary embodiment of the present invention.

FIG. 4 illustrates another embodiment of a motor controller related to the second exemplary embodiment of the present invention, and depicts a more specific instance of the first embodiment.

In comparison with FIG. 2, FIG. 4 shows that phase-excitation switching signals CS1, CS2, CS3 are output in the form of analog voltage signals in order to get detailed positional information, and A/D converter 190 for analog-digital conversion is placed. Three kinds of phase-excitation switching digital signals AD1, AD2, AD3 digitally converted further undergo parallel-serial conversion in serial converter 145, and are transmitted as phase-excitation switching A/D converted information SAD. Information SAD having the detailed positional information is fed into driver 106 and undergoes parallel converter 175 where information SAD is converted to three kinds of phase-excitation switching digital signals AD1, AD2, AD3, which are then fed into power-switching circuit 180.

Figure 5:
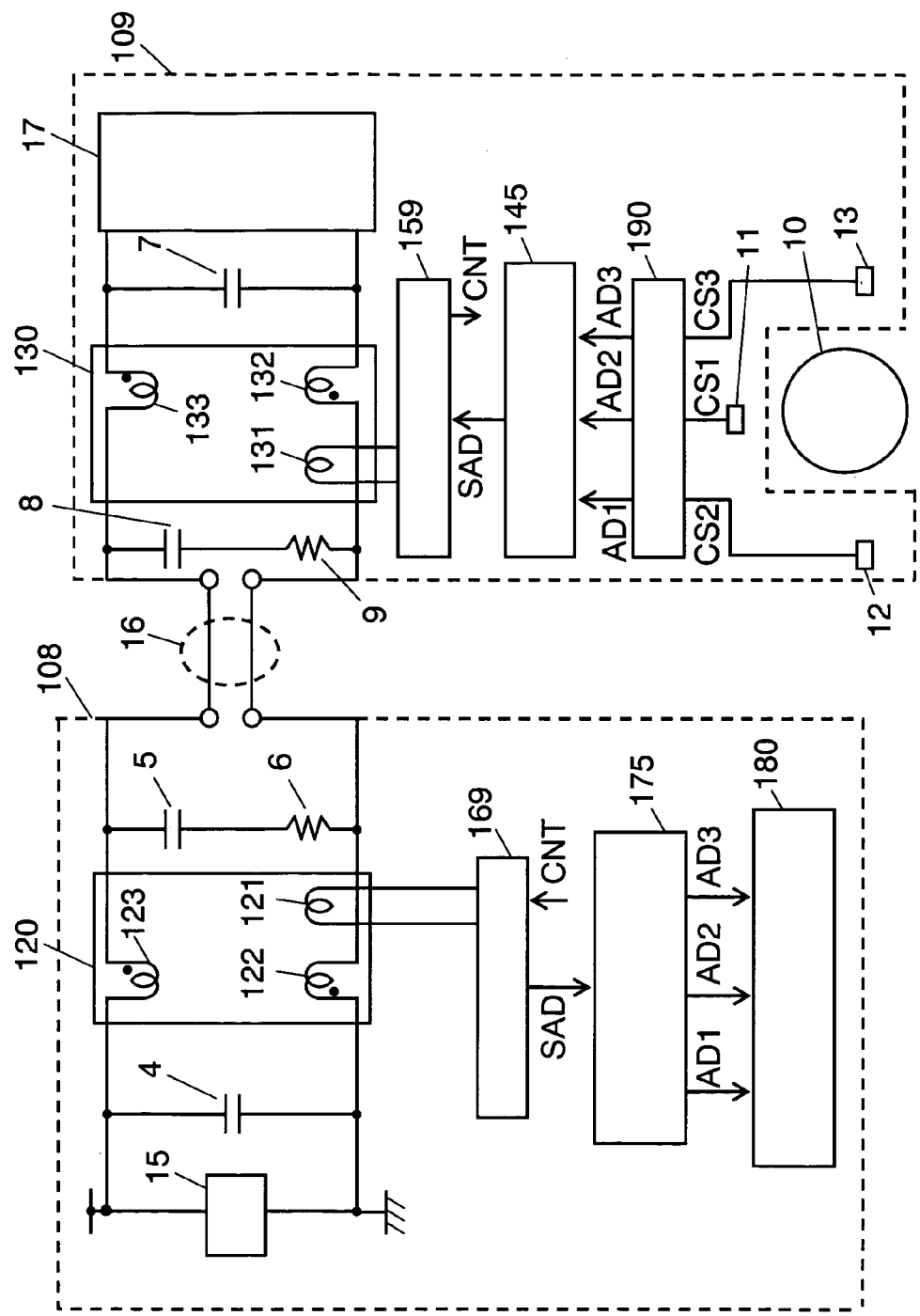
FIG. 5 shows a circuit diagram of another motor controller in accordance with the second exemplary embodiment of the present invention.

FIG. 5 illustrates another motor controller in accordance with the second exemplary embodiment of the present invention, and depicts a more specific instance of the foregoing first embodiment. FIG. 5 shows a controller combining the controllers shown in FIG. 3 and FIG. 4. Position sensing device 109 includes A/D converter 190, and interface 159 a bi-directional transceiver (not shown.) Interface 169 of driver 108 includes also a transceiver (not shown.) This structure allows driver 108 to transmit control signal CNT to position sensing device 109. Control signal CNT transmits a reception timing of phase-excitation switching A/D conversion information SAD of driver 108 to position sensing device 109, thereby adjusting the synchronization of the communication.

Figure 19:
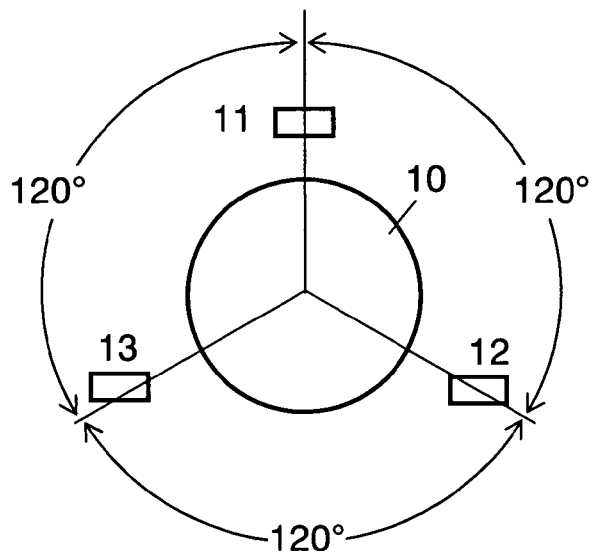
FIG. 19 shows layout example 1 of Hall ICs in a motor controller of the present invention.
Figure 20:
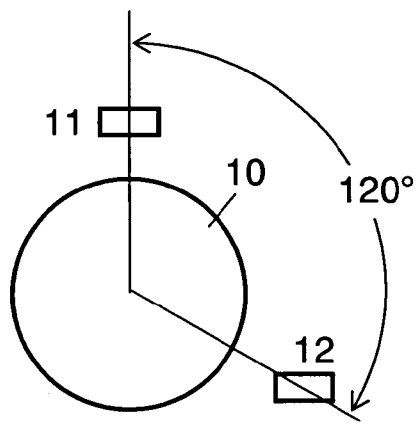
FIG. 20 shows layout example 2 of Hall ICs in a motor controller of the present invention.
Figure 21:
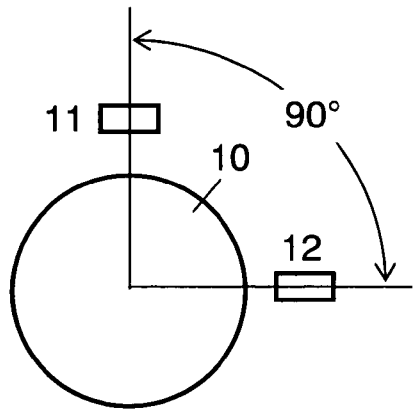
FIG. 21 shows layout example 3 of Hall ICs in a motor controller of the present invention.
Figure 22:
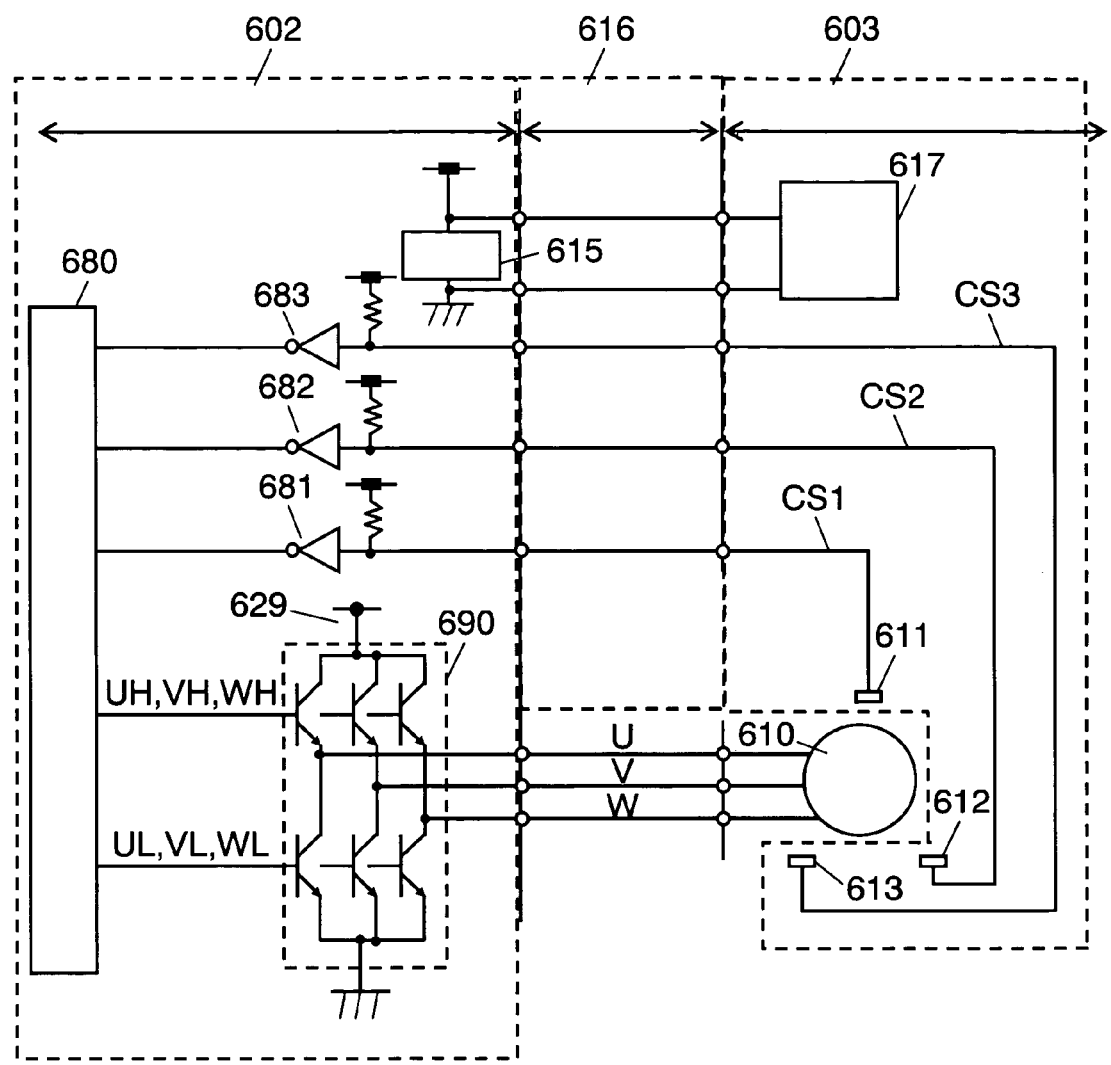
FIG. 22 shows a circuit diagram of a conventional motor controller.
Figure 23:
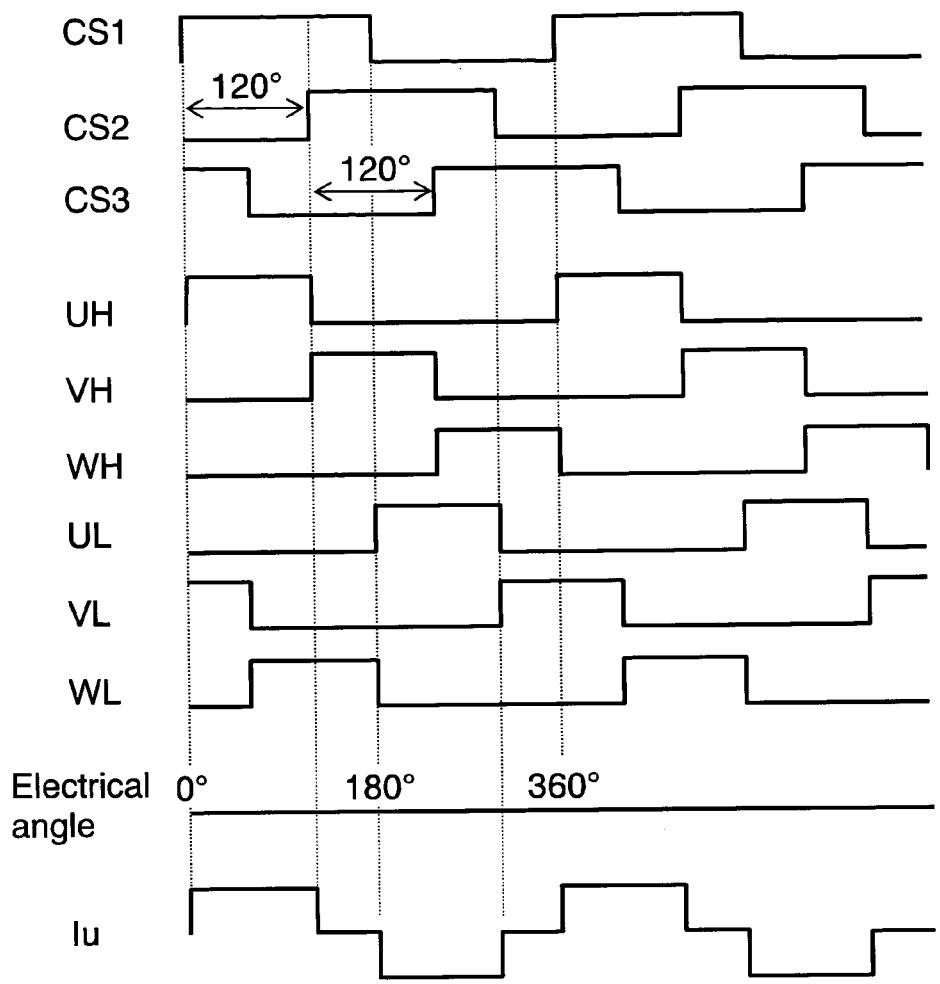
FIG. 23 shows waveforms of the conventional motor controller.
Figure 24:
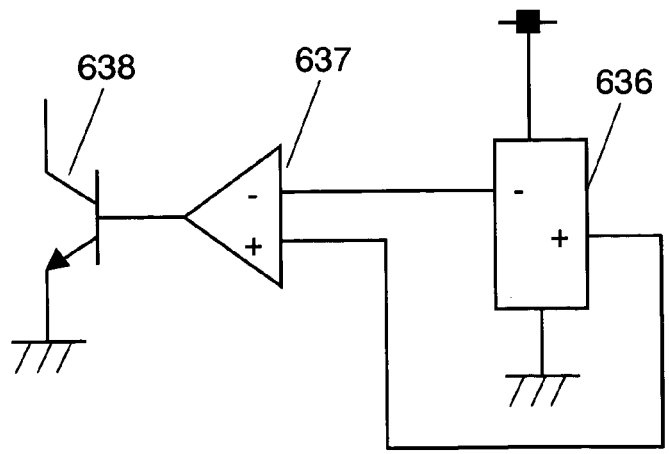
FIG. 24 shows a structure of a Hall IC of the conventional motor controller.

FIG. 19 through FIG. 21 show layout plans of Hall ICs that produce phase-excitation switching signals of the brush-less motor. FIG. 19 shows a layout plan where three Hall ICs are placed at intervals of 120 degrees. FIG. 20 shows a layout plan where two Hall ICs are placed 120 degrees apart. FIG. 21 shows a layout plan where two Hall ICs are placed 90 degrees apart. An appropriate layout plan can be selected from those plans.

Exemplary Embodiment 3

Figure 6:
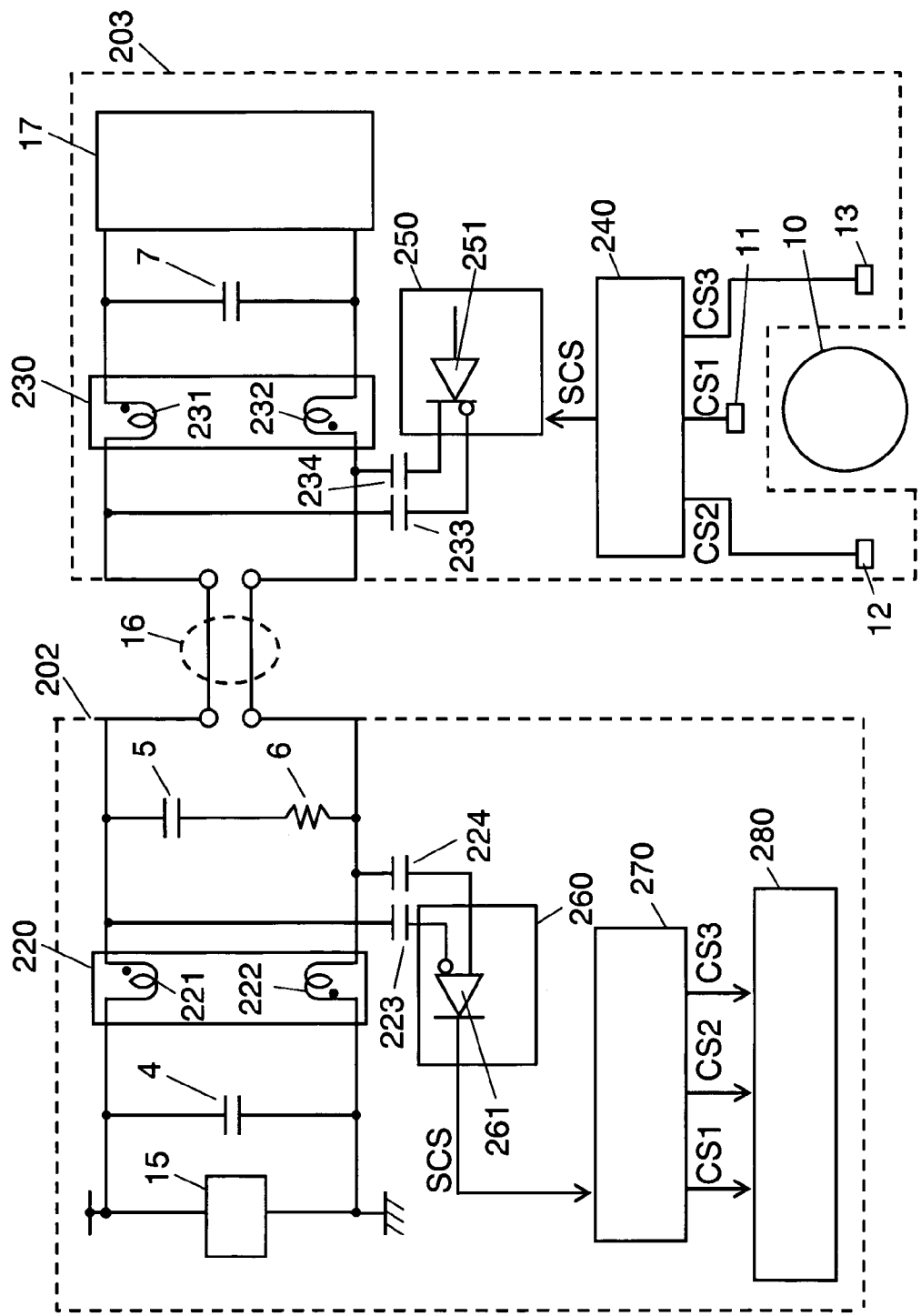
FIG. 6 shows a circuit diagram of a motor controller in accordance with a third exemplary embodiment of the present invention.

FIG. 6 shows a motor controller in accordance with the third exemplary embodiment of the present invention, and depicts a more specific instance of the first embodiment discussed previously. In FIG. 6, the motor driver of the present invention comprises driver 202, position sensing device 203, and wiring section 16. Driver 202 includes dc power supply 15 which powers sensing device 203 via wiring section 16. Power incoming section 17 works as a power supply for sensing device 203.

Position sensing device 203 incorporates the following elements:

two coupling capacitors 233, 234; and sensing-device choke coil 230 having two power-supply wire-wound sections 231, 232 which are coupled to wiring section 16 formed of two cables.

Driver 202 incorporates the following elements:

two coupling capacitors 223, 224;

driver choke coil 220 having two power-supply wire-wound sections 221, 222 which are coupled to wiring section 16 formed of two cables. Choke coils 220, 230 employ respectively an SMD (surface mounted device) formed of E-type split ferrite-core of 10 mm square and a bobbin. The bobbins are wound by two wires in the range between several turns and ten and several turns.

The electrostatic capacities of capacitors 233, 234, 223, and 224 must be large enough for transmitting a signal superposed exactly to a pair of cables (two cables) of wiring section 16. A value of the electrostatic capacity sometimes can be determined without any consideration depending on a length of the cable.

In general, the power supply voltage of dc power supply 15 is 5V, which is supplied from driver 202 to power incoming section 17 of position sensing device 203 via wiring section 16 formed of two cables, namely, one cable for 5V and the other cable for 0V. The power supply voltage thus passes through wire-wound sections 221, 222 of choke coil 220 and wire-wound sections 231, 232 of choke coil 230; however, the number of turns of those wire-wound sections are so small that the power-supply voltage is affected by negligible small dc component.

A brush-less motor is used as motor 10 and equipped with a rotor (not shown) having a permanent magnet. Position sensing device 203 includes position sensors (Hall ICs are used in general, and hereinafter referred to as Hall IC) 11, 12, and 13, and senses a magnetic pole of motor 10. Output signals CS1, CS2, CS3 from the Hall ICs are fed into serial converter 240, where the signals converted into serial signals, so that phase-excitation switching information SCS is obtained. Information SCS is fed into interface 250, which incorporates line driver 251. Information SCS is differentially output by line driver 251 and transmitted to coupling capacitors 233, 234. Since information SCS has undergone the serial conversion, it can carry three kinds of signals CS1, CS2, CS3, which are described in the prior art, as a piece of definite information at fixed intervals. FIG. 18 shows an instance of the phase-excitation switching information undergone the serial conversion.

Line driver 251 is a circuit for differential output, and an interface IC available in the market can be used for this purpose. Phase-excitation switching information SCS transmitted to coupling capacitors 233, 234 is superposed to wiring section 16 by the coupled capacity of capacitors 233, 234.

Information SCS superposed to wiring section 16 is separated by coupling capacitors 223, 224 and fed into interface 260 which includes line receiver 261. Information SCS in the form of serial signal is fed into parallel converter 270, which converts information SCS from serial form into parallel form, so that phase-excitation switching signals CS1, CS2, CS3 in the form of parallel signal necessary for controlling the brush-less motor are fed into power-switching circuit 280. Line receiver 261 is used for differential input, and an interface IC available in the market can be used for this purpose. Power-switching circuit 280 drives motor 10 via an inverter circuit (not shown) formed of six power transistors.

Before power incoming section 17, capacitor 7 of approx. 0.1 $\mu$F is placed, so that noises are prevented from invading power incoming section 17. At a tip of driver 202 working as a receiver, terminator resistor 6 having the same resistance value as a characteristic impedance of wiring section 16 is placed, so that a signal on a transmission line is prevented from reflecting. Because this reflection troubles the signals being transmitted at a high speed with a high frequency. Terminator resistor 6 uses 100$\Omega$ which is the same value as the characteristics impedance of the cable used in this embodiment. Since a dc power supply is used in this embodiment, capacitor 5 is coupled to resistor 6 in series only to work on an ac component of a signal. Because use of only terminator resistor 6 causes resistor 6 to generate heat, and does not allow transmitting a transmission waveform.

Use of a balanced transmission line, which is resistant to noises, can protect the signals against disturbance noises, so that the two cables of wiring section 16 can be twisted for that purpose. Further, the two cables can be shielded for protecting them against disturbance noises.

Figure 7:
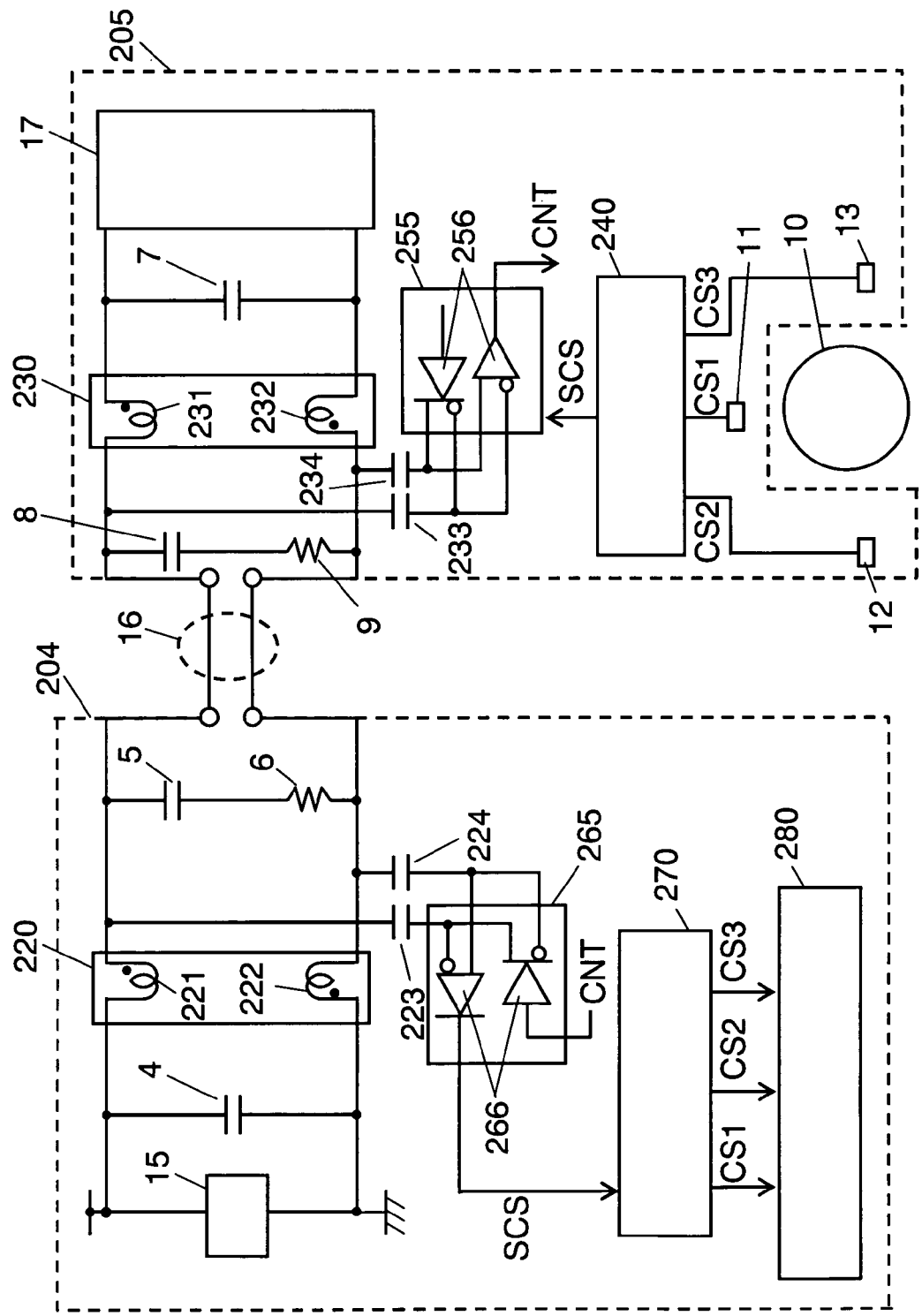
FIG. 7 shows a circuit diagram of another motor controller in accordance with the third exemplary embodiment of the present invention.

FIG. 7 illustrates another motor controller in accordance with the third exemplary embodiment of the present invention, and depicts a more specific instance of the first embodiment discussed previously.

In FIG. 7, interface 250 including line driver 251 and interface 260 including line receiver 261 shown in FIG. 6 are replaced with interfaces 255 and 265 including respectively transceivers 256 and 266 which can transmit and receive signals bi-directionally. Terminator resistor 9 is placed in position sensing device 205 too. Those two points are different from the embodiment shown in FIG. 6. Transceivers 256, 266 are the circuits for bi-directional differential input/output, and an interface IC available in the market can be used for this purpose.

In FIG. 7 driver 204 can transmit control signal CNT to position sensing device 205, while in FIG. 6 position sensing device 203 transmits the signal to driver 202 in only one way. Control signal CNT is needed for a sophisticated device, and transmits a reception timing of phase-excitation switching information SCS at driver 204 to position sensing device 205, thereby adjusting synchronization of the communication.

Figure 8:
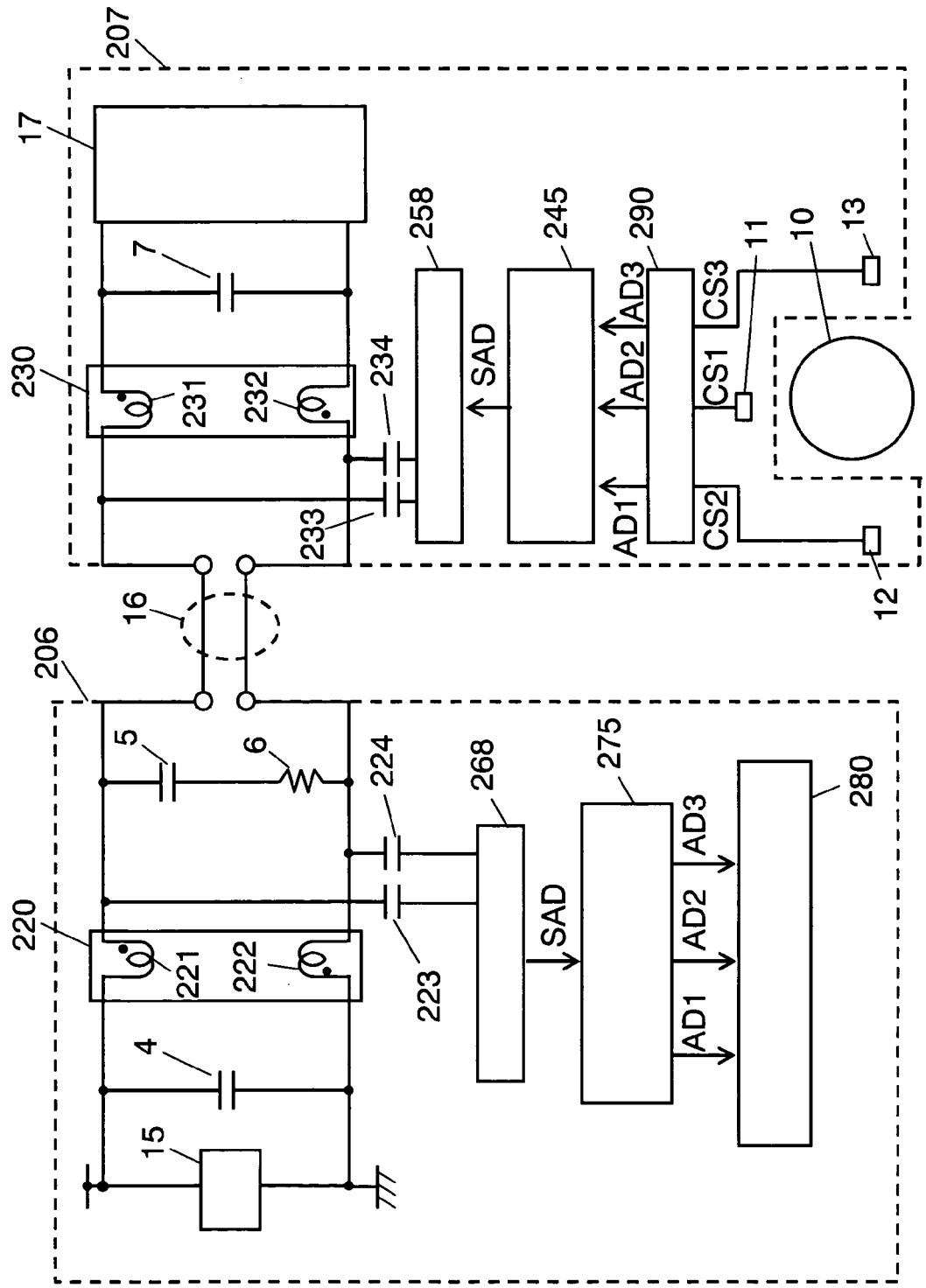
FIG. 8 shows a circuit diagram of another motor controller in accordance with the third exemplary embodiment of the present invention.

FIG. 8 illustrates another embodiment of a motor controller related to the third exemplary embodiment of the present invention, and depicts a more specific instance of the first embodiment discussed previously.

In comparison with FIG. 6, FIG. 8 shows that phase-excitation switching signals CS1, CS2, CS3 are output in the form of analog voltage signals in order to get detailed positional information, and A/D converter 290 for analog-digital conversion is placed. Three kinds of phase-excitation switching digital signals AD1, AD2, AD3 digitally converted further undergo parallel-serial conversion in serial converter 245, and are transmitted as phase-excitation switching A/D converted information SAD. This information SAD having the detailed positional information is fed into driver 206 and undergoes parallel converter 275 which converts information SAD into three kinds of phase-excitation switching digital signals AD1, AD2, AD3, which are then fed into power-switching circuit 280.

Figure 9:
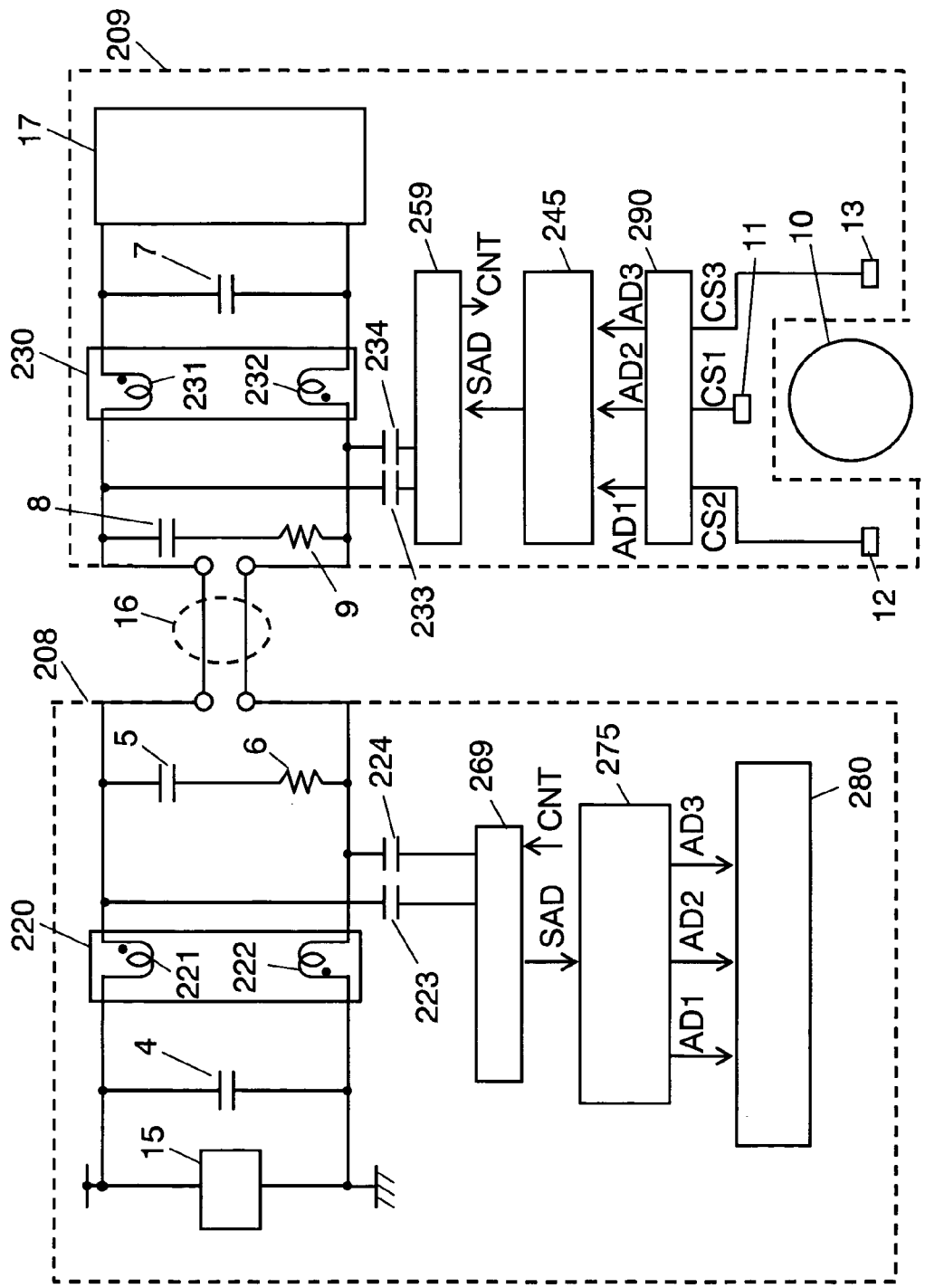
FIG. 9 shows a circuit diagram of another motor controller in accordance with the third exemplary embodiment of the present invention.

FIG. 9 illustrates another motor controller in accordance with the third exemplary embodiment of the present invention, and depicts a more specific instance of the first embodiment previously discussed. FIG. 9 shows a controller combining the controllers shown in FIG. 7 and FIG. 8. Position sensing device 209 includes A/D converter 290, and interface 259 includes a bi-directional transceiver (not shown.) Interface 269 of driver 208 includes also a bi-directional transceiver (not shown.) This structure allows driver 208 to transmit control signal CNT to position sensing device 209. Control signal CNT transmits a reception timing of phase-excitation switching A/D conversion information SAD of driver 208 to position sensing device 209, thereby adjusting the synchronization of the communication.

FIG. 19 through FIG. 21 show layout plans of Hall ICs that produce phase-excitation switching signals of the brush-less motor. FIG. 19 shows a layout plan where three Hall ICs are placed at intervals of 120 degrees. FIG. 20 shows a layout plan where two Hall ICs are placed 120 degrees apart. FIG. 21 shows a layout plan where two Hall ICs are placed 90 degrees apart. An appropriate layout plan can be selected from those plans.

Exemplary Embodiment 4

Figure 10:
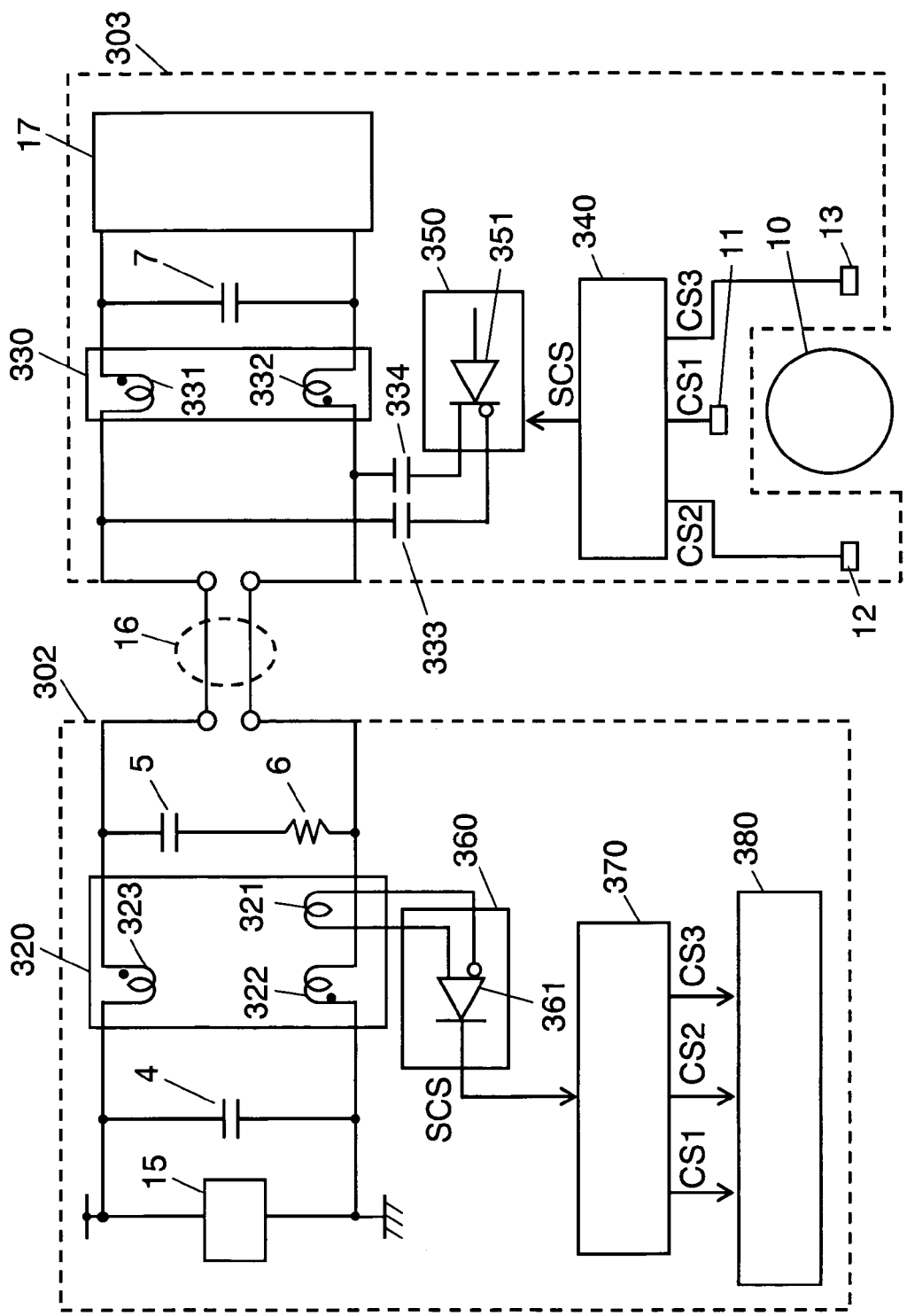
FIG. 10 shows a circuit diagram of a motor controller in accordance with a fourth exemplary embodiment of the present invention.

FIG. 10 illustrates a motor controller in accordance with the fourth exemplary embodiment of the present invention, and depicts a more specific instance of the first embodiment previously discussed.

In FIG. 10, the motor controller of the present invention comprises driver 302, position sensing device 303, and wiring section 16. Driver 302 includes dc power supply 15 which powers position sensing device 303 via wiring section 16, and power incoming section 17 works as a power supply to position sensing device 303.

Position sensing device 303 incorporates two coupling capacitors 333, 334, and sensing-device choke coil 330 equipped with two power-supply wire-wound sections 331, 332 coupled to wiring section 16 formed of two cables. Driver 302 incorporates driver transformer 320 that is formed of a piece of signal wire-wound section 321 and two power-supply wire-wound sections 322, 323 coupled to wiring section 16 formed of two cables. Transformers 320 employs an SMD (surface mounted device) formed of E-type split ferrite-core of 10 mm square and a bobbin. The bobbin is wound by three wires in the range between several turns and ten and several turns. Among the three wires, one is assigned to signal wire-wound section 321, and the other two wires are assigned to power-supply wire-wound 322, 323.

When an inductance of signal wire-wound section 321 is not large enough, a signal is exactly superposed to wiring section 16, so that the signal cannot be transmitted. As a result, one wire assigned to signal wire-wound section 321 needs several turns greater than those of the other two wires. In this embodiment, two wires of the power-supply wire-wound sections are wound 8 turns, and the wire of the signal wire-wound sections is wound 16 turns. For instance, when Manchester code of 5 Mbps (transmission rate) is used, an inductance of approx. 40 $\mu$H, which is practically needed, can be obtained.

In general, the power supply voltage of dc power supply 15 is 5V, which is supplied from driver 302 to power incoming section 17 of position sensing device 303 via wiring section 16 formed of two cables, namely, one cable for 5V and the other cable for 0V. The power supply voltage thus passes through wire-wound sections 322, 323 of transformer 320 and wire-wound sections 331, 332 of choke coil 330; however, the number of turns of those wire-wound sections are so small that the power-supply voltage is affected by negligible small dc component.

The electrostatic capacities of capacitors 333, 334 must be large enough for transmitting a signal superposed exactly to a pair of cables (two cables) of wiring section 16. A value of the electrostatic capacity sometimes can be determined without any consideration depending on a length of the cable.

A brush-less motor is used as motor 10 and equipped with a rotor (not shown) having a permanent magnet. Position sensing device 303 includes position sensors (Hall ICs are used in general, and hereinafter referred to as Hall IC) 11, 12, and 13, and senses a magnetic pole of motor 10. Output signals CS1, CS2, CS3 from the Hall ICs are fed into serial converter 340, which converts the signals into serial signals, so that phase-excitation switching information SCS is obtained. Information SCS is fed into interface 350, which incorporates line driver 351. Information SCS is differentially output by line driver 351 and transmitted to coupling capacitors 333, 334. Since information SCS has undergone the serial conversion, it can carry three kinds of signals CS1, CS2, CS3, which are described in the prior art, as a piece of definite information at fixed intervals. FIG. 18 shows an instance of the phase-excitation switching information undergone the serial conversion.

Line driver 351 is a circuit for differential output, and an interface IC available in the market can be used for this purpose. Phase-excitation switching information SCS transmitted to coupling capacitors 333, 334 is superposed to wiring section 16 by the coupled capacity of capacitors 333, 334.

Information SCS superposed to wiring section 16 is transmitted to wire-wound sections 322, 323, then separated by transformer 320 at signal wire-wound section 321, and fed into interface 360 which includes line receiver 361. Information SCS in the form of serial signal is fed into parallel converter 370, where information SCS is converted from serial form into parallel form, so that phase-excitation switching signals CS1, CS2, CS3 in the form of parallel signal necessary for controlling the brush-less motor are fed into power-switching circuit 380. Line receiver 361 is used for differential input, and an interface IC available in the market can be used for this purpose. Power-switching circuit 380 drives motor 10 via an inverter circuit (not shown) formed of six power transistors.

Before power incoming section 17, capacitor 7 of approx. 0.1 $\mu$F is placed, so that noises are prevented from invading power incoming section 17. At a tip of driver 302 working as a receiver, terminator resistor 6 having the same resistance value as a characteristic impedance of wiring section 16 is placed, so that a signal on a transmission line is prevented from reflecting. Because this reflection troubles the signals being transmitted at a high speed with a high frequency. Terminator resistor 6 uses 100$\Omega$ which is the same value as the characteristics impedance of the cable used in this embodiment. Since a dc power supply is used in this embodiment, capacitor 5 is coupled to resistor 6 in series only to work on an ac component of a signal. Because use of only terminator resistor 6 causes resistor 6 to generate heat, and does not allow transmitting a transmission waveform.

Use of a balanced transmission line, which is resistant to noises, can protect the signals against disturbance noises, so that the two cables of wiring section 16 can be twisted for that purpose. Further, the two cables can be shielded for protecting them against disturbance noises.

Figure 11:
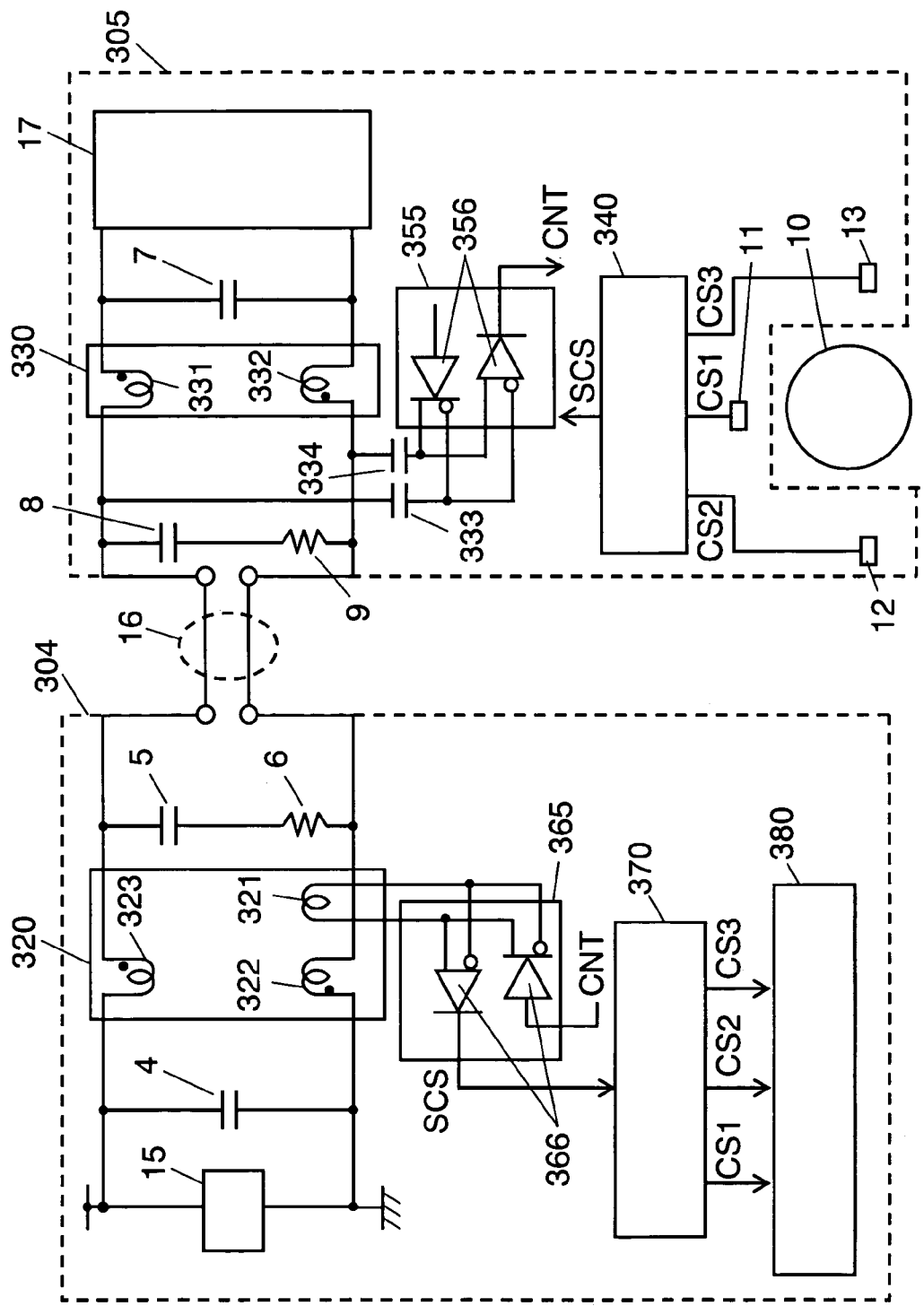
FIG. 11 shows a circuit diagram of another motor controller in accordance with the fourth exemplary embodiment of the present invention.

FIG. 11 illustrates another motor controller in accordance with the fourth exemplary embodiment of the present invention, and depicts a more specific instance of the first embodiment discussed previously.

In FIG. 11, interface 350 including line driver 351 and interface 360 including line receiver 361 shown in FIG. 10 are replaced with interfaces 355 and 365 including respectively transceivers 356 and 366 which can transmit and receive signals bi-directionally. Terminator resistor 9 is placed in position sensing device 305 too. Those two points are different from the embodiment shown in FIG. 10. Transceivers 356, 366 are the circuits for bi-directional differential input/output, and an interface IC available in the market can be used for this purpose.

In FIG. 11 driver 304 can transmit control signal CNT to position sensing device 305, while in FIG. 10 position sensing device 303 transmits the signal to driver 302 only in one way. Control signal CNT is needed for a sophisticated device, and transmits a reception timing of phase-excitation switching information SCS at driver 304 to position sensing device 305, thereby adjusting synchronization of the communication.

Figure 12:
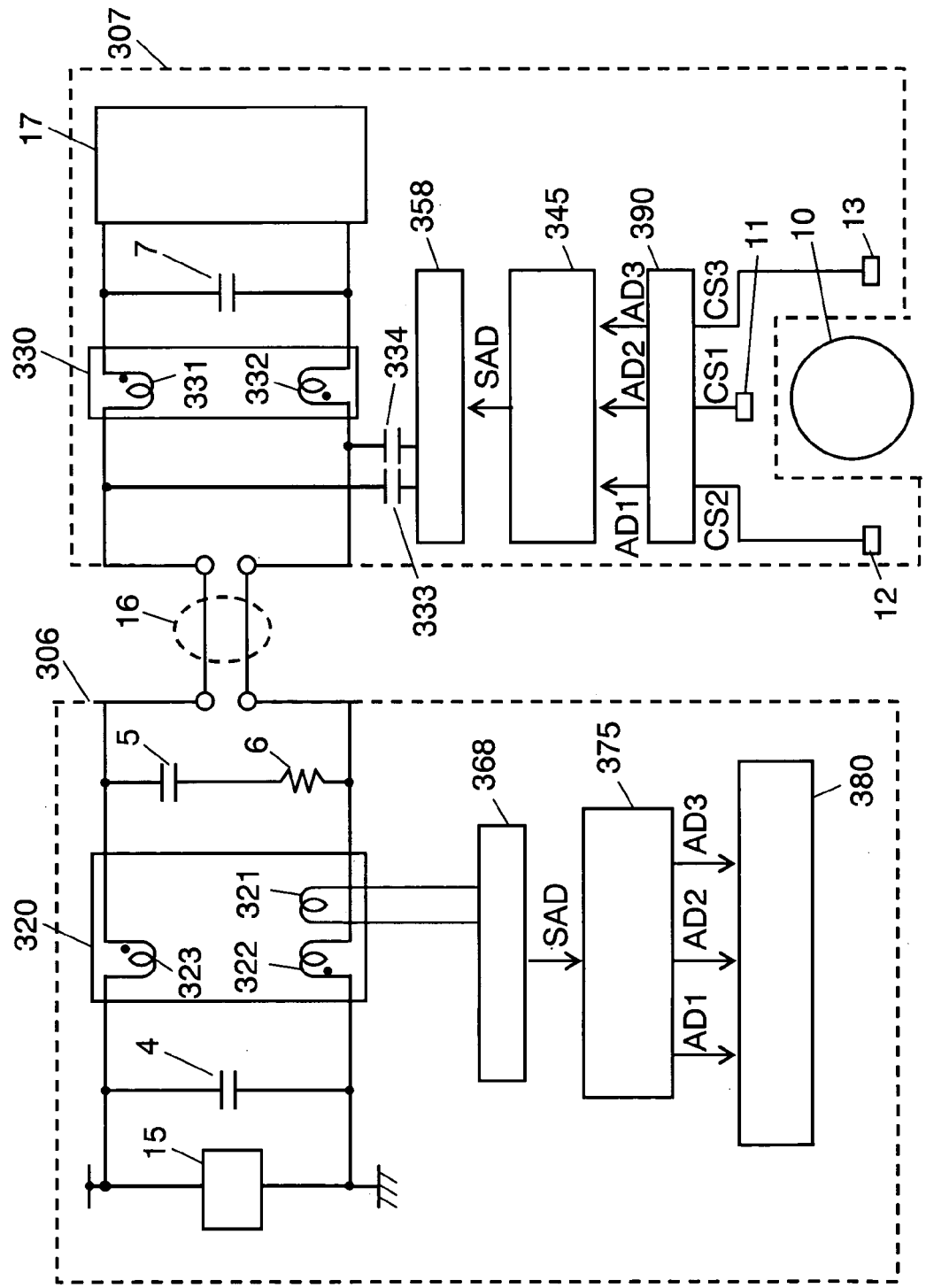
FIG. 12 shows a circuit diagram of another motor controller in accordance with the fourth exemplary embodiment of the present invention.

FIG. 12 illustrates another embodiment of a motor controller related to the fourth exemplary embodiment of the present invention, and depicts a more specific instance of the first embodiment.

In comparison with FIG. 10, FIG. 12 shows that phase-excitation switching signals CS1, CS2, CS3 are output in the form of analog voltage signals in order to get detailed positional information, and A/D converter 390 for analog-digital conversion is prepared. Three kinds of phase-excitation switching digital signals AD1, AD2, AD3 digitally converted further undergo parallel-serial conversion in serial converter 345, and are transmitted as phase-excitation switching A/D converted information SAD. This information SAD having the detailed positional information is fed into driver 306 and undergoes parallel converter 375 where information SAD is converted to three kinds of phase-excitation switching digital signals AD1, AD2, AD3, which are then fed into power-switching circuit 380.

Figure 13:
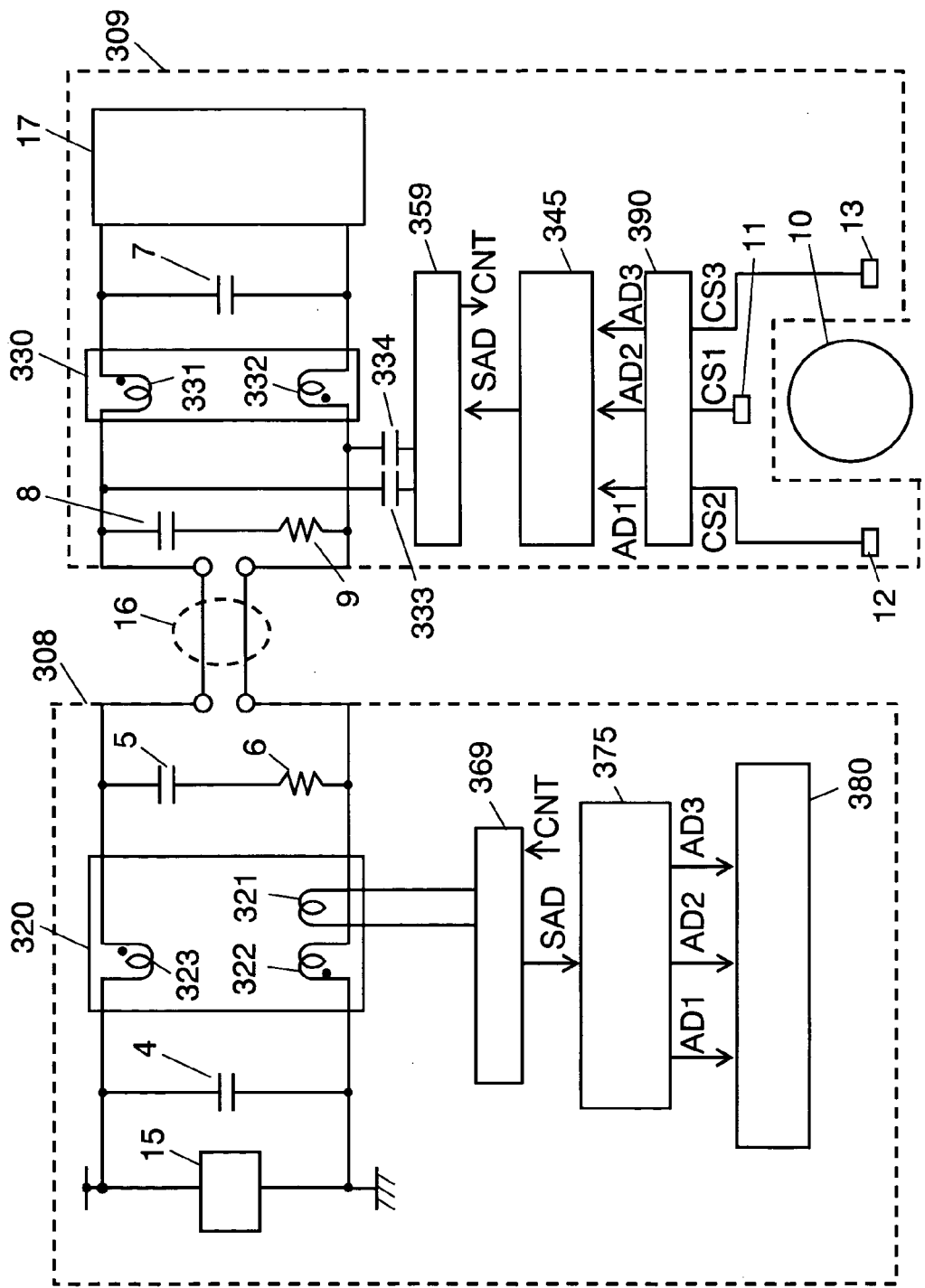
FIG. 13 shows a circuit diagram of another motor controller in accordance with the fourth exemplary embodiment of the present invention.

FIG. 13 illustrates another motor controller in accordance with the fourth exemplary embodiment of the present invention, and depicts a more specific instance of the first embodiment discussed previously. FIG. 13 shows a controller combining the controllers shown in FIG. 11 and FIG. 12. Position sensing device 309 includes A/D converter 390, and interface 359 includes a bi-directional transceiver (not shown.) Interface 369 of driver 308 includes also a bi-directional transceiver (not shown.) This structure allows driver 308 to transmit control signal CNT to position sensing device 309. Control signal CNT transmits a reception timing of phase-excitation switching A/D conversion information SAD of driver 308 to position sensing device 309, thereby adjusting the synchronization of the communication.

FIG. 19 through FIG. 21 show layout plans of Hall ICs that produce phase-excitation switching signals of the brush-less motor. FIG. 19 shows a layout plan where three Hall ICs are placed at intervals of 120 degrees. FIG. 20 shows a layout plan where two Hall ICs are placed 120 degrees apart. FIG. 21 shows a layout plan where two Hall ICs are placed 90 degrees apart. An appropriate layout plan can be selected from those plans.

Exemplary Embodiment 5

Figure 14:
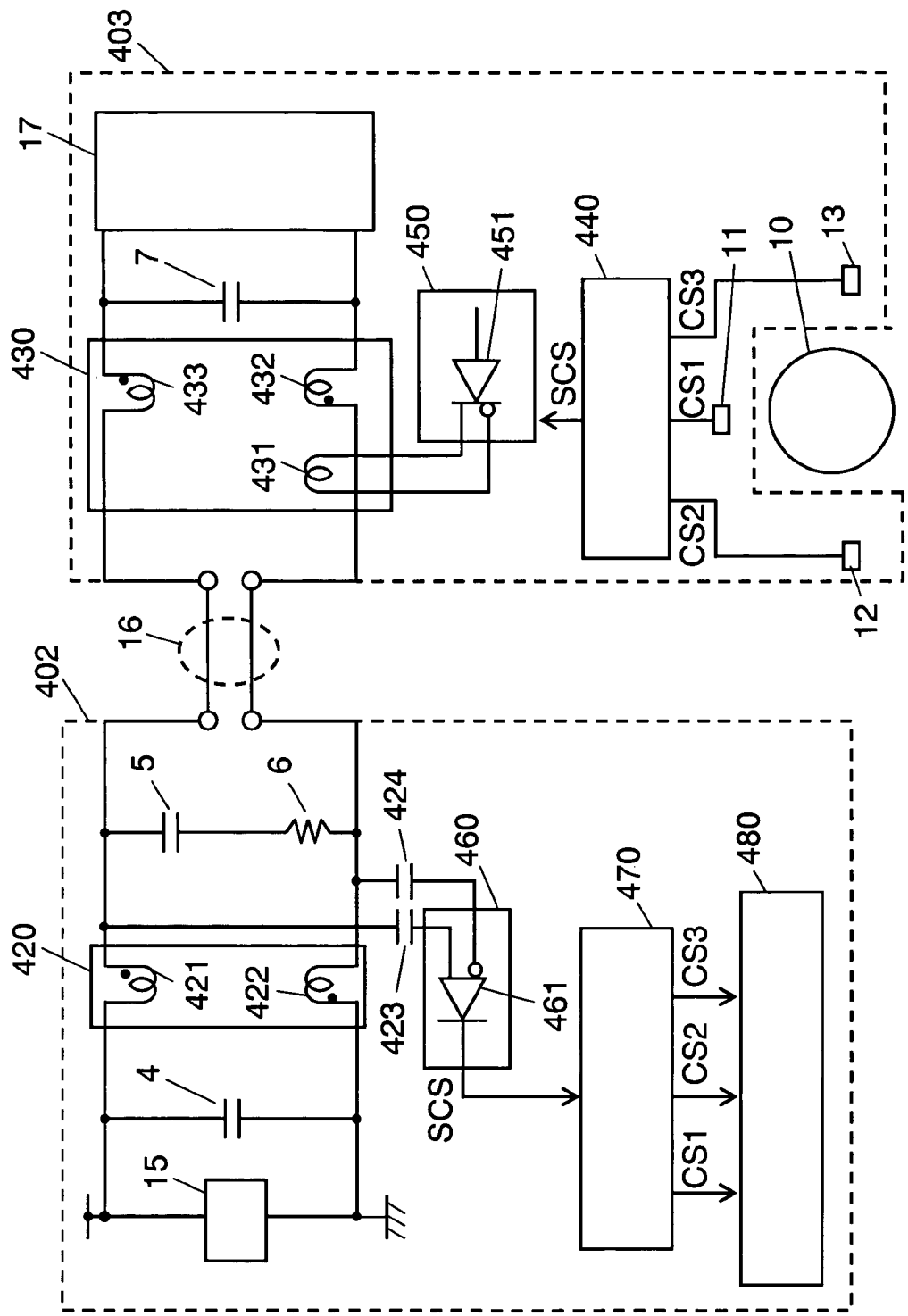
FIG. 14 shows a circuit diagram of a motor controller in accordance with a fifth exemplary embodiment of the present invention.

FIG. 14 illustrates a motor controller in accordance with the fifth exemplary embodiment of the present invention, and depicts a more specific instance of the first embodiment previously discussed.

In FIG. 14, the motor controller of the present invention comprises driver 402, position sensing device 403, and wiring section 16. Driver 402 includes dc power supply 15 which powers position sensing device 403 via wiring section 16, and power incoming section 17 works as a power supply to position sensing device 403.

Position sensing device 403 incorporates sensing-device transformer 430 that is formed of a piece of signal wire-wound section 431 and two power-supply wire-wound sections 432, 433 coupled to wiring section 16 having two cables. Driver 202 incorporates the following elements:
  two coupling capacitors 423, 424;
  driver choke coil 420 having two power-supply wire-wound sections 421, 422 which are coupled to wiring section 16 formed of two cables.

Transformer 430 employs an SMD (surface mounted device) formed of E-type split ferrite-core of 10 mm square and a bobbin. The bobbin is wound by three wires in the range between several turns and ten and several turns. Among the three wires, one is assigned to signal wire-wound section 431, and the other two wires are assigned to power-supply wire-wound 432, 433.

When an inductance of signal wire-wound section 431 is not large enough, a signal is not exactly superposed to wiring section 16, so that the signal cannot be transmitted. As a result, one wire assigned to signal wire-wound section 431 needs several turns greater than those of the other two wires. In this embodiment, two wires of the power-supply wire-wound sections are wound 8 turns, and the wire of the signal wire-wound sections is wound 16 turns. For instance, when Manchester code of 5 Mbps (transmission rate) is used, an inductance of approx. 40 $\mu$H, which is practically needed, can be obtained.

The electrostatic capacities of capacitors 423 and 424 must be large enough for transmitting a signal superposed exactly to a pair of cables (two cables) of wiring section 16.

A value of the electrostatic capacity sometimes can be determined without any consideration depending on a length of the cable.

In general, the power supply voltage of dc power supply 15 is 5V, which is supplied from driver 402 to power incoming section 17 of position sensing device 403 via wiring section 16 formed of two cables, namely, one cable for 5V and the other cable for 0V. The power supply voltage thus passes through wire-wound sections 421, 422 of driver choke coil 420 and wire-wound sections 432, 433 of sensing-device transformer 430; however, the number of turns of those wire-wound sections are so small that the power-supply voltage is affected by negligible small dc component.

A brush-less motor is used as motor 10 and equipped with a rotor (not shown) having a permanent magnet. Position sensing device 403 includes position sensors (Hall ICs are used in general, and hereinafter referred to as Hall IC) 11, 12, and 13, and senses a magnetic pole of motor 10. Output signals CS1, CS2, CS3 from the Hall ICs are fed into serial converter 440, where the signals converted into serial signals, so that phase-excitation switching information SCS is obtained. Information SCS is fed into interface 450, which incorporates line driver 451. Information SCS is differentially output by line driver 451 and transmitted to signal wire-wound section 431. Since information SCS has undergone the serial conversion, it can carry three kinds of signals CS1, CS2, CS3, which are described in the prior art, as a piece of definite information at fixed intervals. FIG. 18 shows an instance of the phase-excitation switching information undergone the serial conversion.

Line driver 451 is a circuit for differential output, and an interface IC available in the market can be used for this purpose. Phase-excitation switching information SCS transmitted to signal wire-wound section 431 is superposed to power supply wire-wound sections 432, 433 by the electromagnetic induction of transformer 430.

Phase-excitation switching information SCS superposed to power supply wire-wound sections 432, 433 passes through wiring section 16, and is separated by coupling capacitors 423, 424, then fed into interface 460 having line receiver 461. Information SCS in the form of serial signal is fed into parallel converter 470, where information SCS is converted from serial form into parallel form, so that phase-excitation switching signals CS1, CS2, CS3 in the form of parallel signal necessary for controlling the brush-less motor are fed into power-switching circuit 480. Line receiver 461 is used for differential input, and an interface IC available in the market can be used for this purpose. Power-switching circuit 480 drives motor 10 via an inverter circuit (not shown) formed of six power transistors.

Before power incoming section 17, capacitor 7 of approx. 0.1 $\mu$F is placed, so that noises are prevented from invading power incoming section 17. At a tip of driver 402 working as a receiver, terminator resistor 6 having the same resistance value as a characteristic impedance of wiring section 16 is placed, so that a signal on a transmission line is prevented from reflecting. Because this reflection troubles the signals being transmitted at a high speed with a high frequency. Terminator resistor 6 uses 100$\Omega$ which is the same value as the characteristics impedance of the cable used in this embodiment. Since a dc power supply is used in this embodiment, capacitor 5 is coupled to resistor 6 in series only to work on an ac component of a signal. Because use of only terminator resistor 6 causes resistor 6 to generate heat, and does not allow transmitting a transmission waveform.

Use of a balanced transmission line, which is resistant to noises, can protect the signals against disturbance noises, so that the two cables of wiring section 16 can be twisted for that purpose. Further, the two cables can be shielded for protecting them against disturbance noises.

Figure 15:
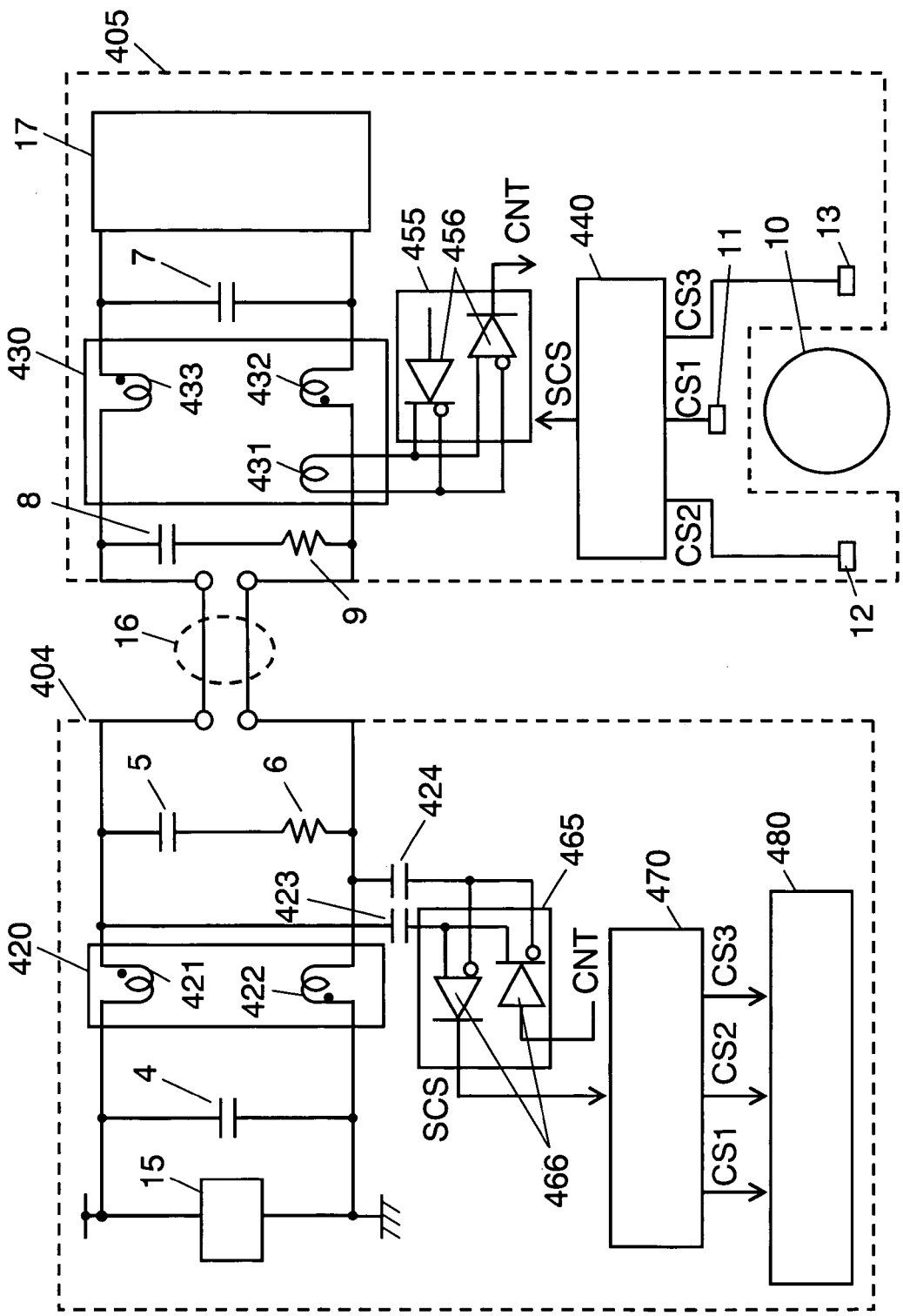
FIG. 15 shows a circuit diagram of another motor controller in accordance with the fifth exemplary embodiment of the present invention.

FIG. 15 illustrates another motor controller in accordance with the fifth exemplary embodiment of the present invention, and depicts a more specific instance of the first embodiment discussed previously.

In FIG. 15, interface 450 including line driver 451 and interface 460 including line receiver 461 shown in FIG. 14 are replaced with interfaces 455 and 465 including respectively transceivers 456 and 466 which can transmit and receive signals bi-directionally. Terminator resistor 9 is placed in position sensing device 405 too. Those two points are different from the embodiment shown in FIG. 14. Transceivers 456, 466 are the circuits for bi-directional differential input/output, and an interface IC available in the market can be used for this purpose.

In FIG. 15 driver 404 can transmit control signal CNT to position sensing device 405, while in FIG. 14 position sensing device 403 transmits the signal to driver 402 only in one way. Control signal CNT is needed for a sophisticated device, and transmits a reception timing of phase-excitation switching information SCS at driver 404 to position sensing device 405, thereby adjusting synchronization of the communication.

Figure 16:
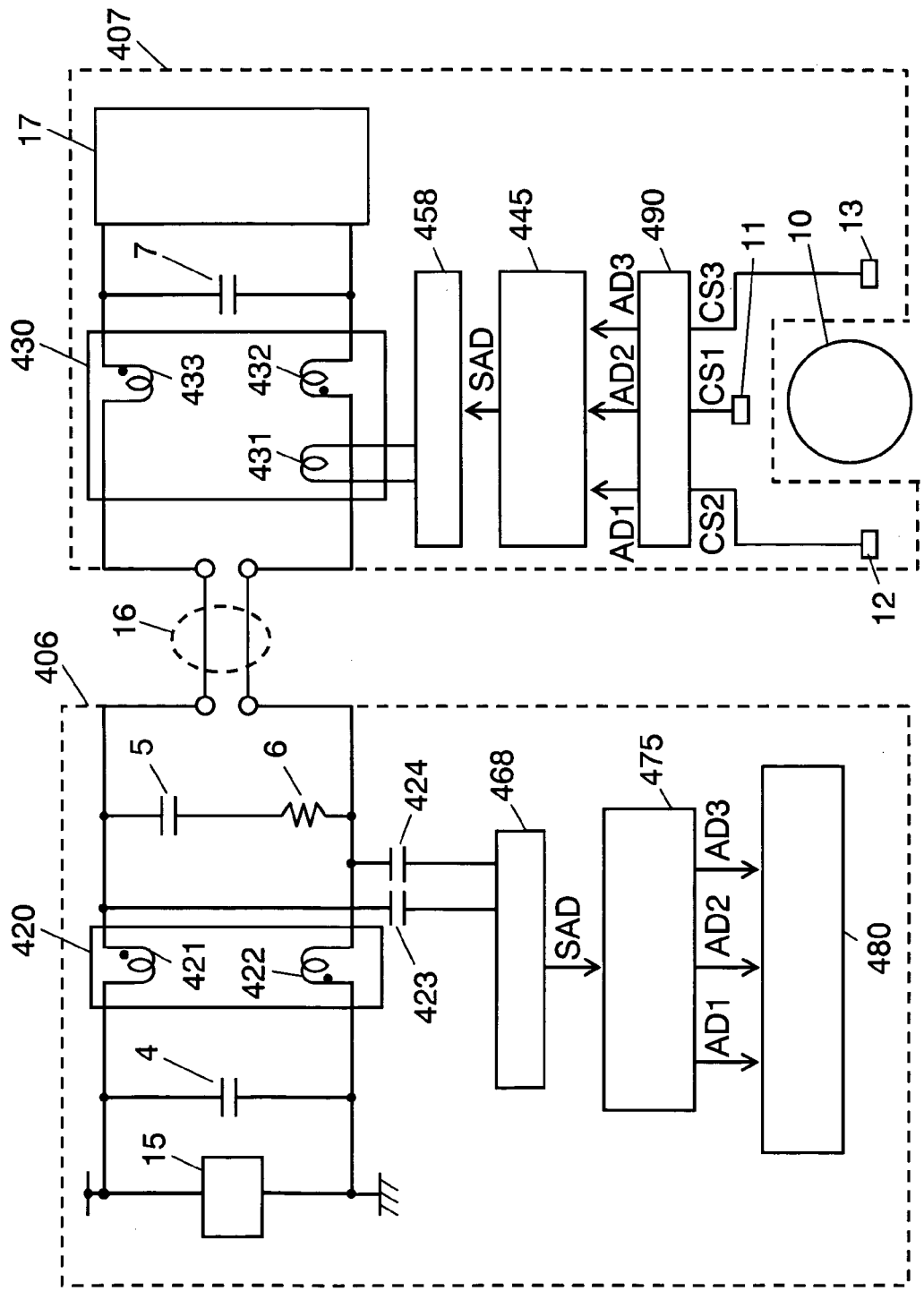
FIG. 16 shows a circuit diagram of another motor controller in accordance with the fifth exemplary embodiment of the present invention.

FIG. 16 illustrates another motor controller in accordance with the fifth exemplary embodiment of the present invention, and depicts a more specific instance of the first embodiment previously discussed.

In comparison with FIG. 14, FIG. 16 shows that phase-excitation switching signals CS1, CS2, CS3 are output in the form of analog voltage signals in order to get detailed positional information, and A/D converter 490 for analog-digital conversion is placed. Three kinds of phase-excitation switching digital signals AD1, AD2, AD3 digitally converted further undergo parallel-serial conversion in serial converter 445, and are transmitted as phase-excitation switching A/D converted information SAD. Information SAD having the detailed positional information is fed into driver 406 and undergoes parallel converter 475 where information SAD is converted to three kinds of phase-excitation switching digital signals AD1, AD2, AD3, which are then fed into power-switching circuit 480.

Figure 17:
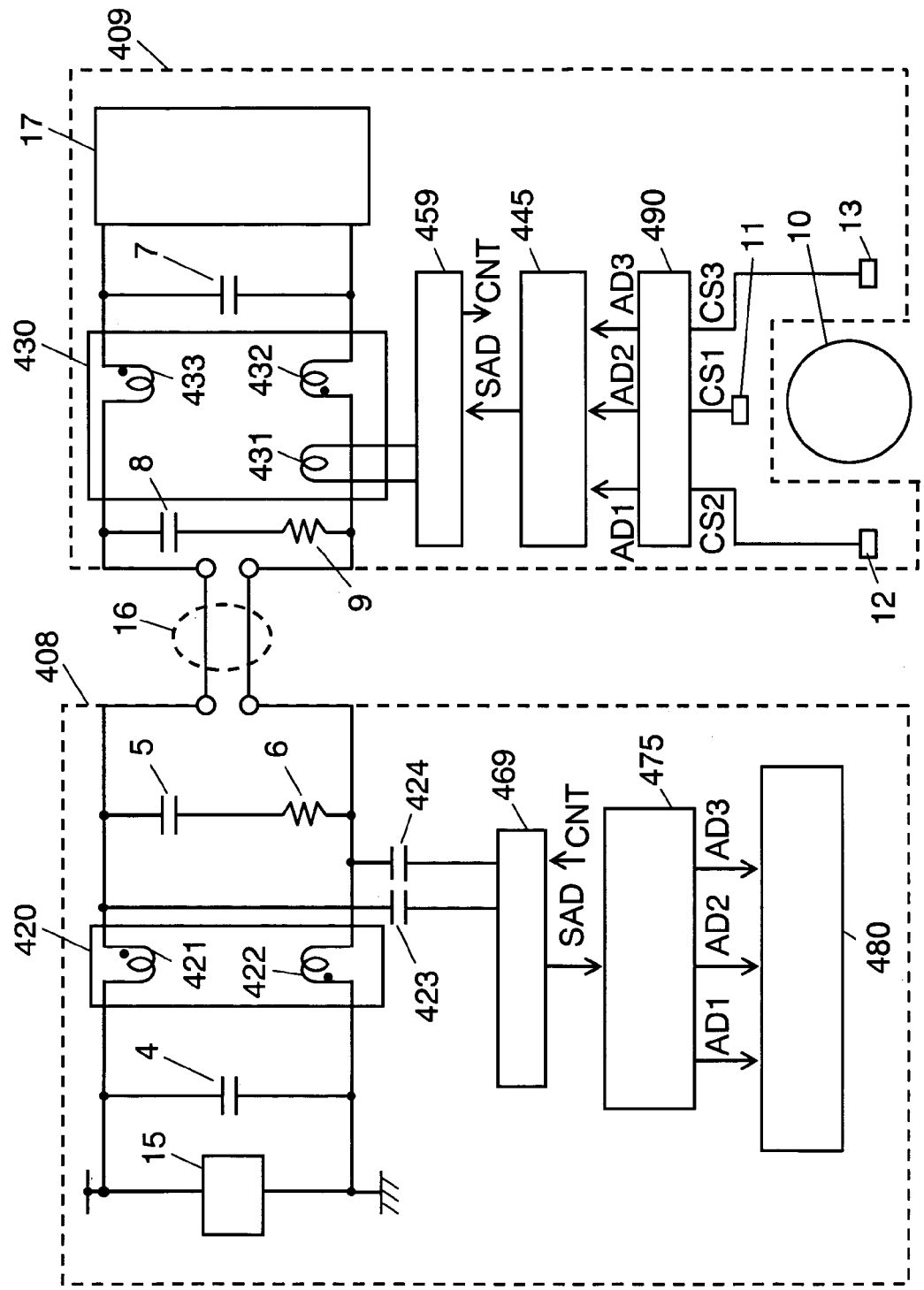
FIG. 17 shows a circuit diagram of another motor controller in accordance with the fifth exemplary embodiment of the present invention.

FIG. 17 illustrates another motor controller in accordance with the fifth exemplary embodiment of the present invention, and depicts a more specific instance of the first embodiment previously discussed.

FIG. 17 shows a controller combining the controllers shown in FIG. 15 and FIG. 16. Position sensing device 409 includes A/D converter 490, and interface 459 includes a bi-directional transceiver (not shown.) Interface 469 of driver 408 includes also a bi-directional transceiver (not shown.) This structure allows driver 408 to transmit control signal CNT to position sensing device 409. Control signal CNT transmits a reception timing of phase-excitation switching A/D conversion information SAD of driver 408 to position sensing device 409, thereby adjusting the synchronization of the communication.

FIG. 19 through FIG. 21 show layout plans of Hall ICs that produce phase-excitation switching signals of the brush-less motor. FIG. 19 shows a layout plan where three Hall ICs are placed at intervals of 120 degrees. FIG. 20 shows a layout plan where two Hall ICs are placed 120 degrees apart.

FIG. 21 shows a layout plan where two Hall ICs are placed 90 degrees apart. An appropriate layout plan is selected from those plans.

What is claimed is:

1. A motor controller including a position sensing device having a position sensor for sensing a magnetic pole of a motor, a driver for driving the motor, and a wiring section for feeding a power supply voltage from the driver into the position sensing device, wherein
the position sensing device comprises:
a superposed wave transmitter coupled to a first end of the wiring section;
a serial converter for converting a signal of the position sensor into a serial signal; and
a sensing-device interface disposed between the serial converter and the superposed wave transmitter,
the driver comprises:
a dc power supply;
a superposed wave receiver coupled between the dc power supply and a second end of the wiring section;
a parallel converter for converting the serial signal into a parallel signal;
a driver interface disposed between the superposed wave receiver and the parallel converter; and
a power switching circuit to be driven by the parallel signal,
wherein the serial signal is superposed to the wiring section and transmitted, and the power switching circuit switches a phase excitation for driving the motor, and
wherein the superposed wave transmitter includes a sensing-device transformer, which has a power supply wire-wound section coupled to the first end of the wiring section and a signal wire-wound section coupled to the sensing-device interface; and
the superposed wave receiver includes a driver transformer, which has a power supply wire-wound section coupled to the second end of the wiring section and a signal wire-wound section coupled to the driver interface.

2. The motor controller of claim 1, wherein the sensing-device interface has a transmitting circuit, and the driver interface has a receiving circuit, and the serial signal is transmitted from the sensing device to the driver in one way.

3. The motor controller of claim 1,
wherein the sensing-device interface and the driver interface have respectively a transceiver,
wherein the serial signal is transmitted from the sensing device to the driver, and a control signal for adjusting synchronization of communication is transmitted from the driver to the position sensing device.

4. The motor controller of claim 1, wherein the position sensing device further includes an A/D converter, and the signal of the position sensor is converted into a digital signal, then fed into the serial converter.

5. The motor controller of claim 4, wherein the position sensor is formed of three or two Hall elements, which are arranged at intervals of 120 degrees.

6. The motor controller of claim 4, wherein the position sensor is formed of two Hall elements, which are arranged at an interval of 90 degrees.

7. The motor controller of claim 1, wherein the position sensing device further includes a power incoming section, wherein the power supply wire-wound section of the sensing-device transformer is inserted between a positive side and a negative side in series between the wiring section and the power incoming section, wherein the power incoming section forms a power supply of the position sensing device.

8. The motor controller of claim 1, wherein the power supply wire-wound section of the driver transformer is inserted between a positive side and a negative side in series of the dc power supply.

9. The motor controller of claim 7, wherein the position sensing device further includes a capacitor coupled to the power incoming section in parallel.

10. The motor controller of claim 1, wherein the driver further includes a capacitor coupled to the dc power supply in parallel.

11. The motor controller of claim 1, wherein the driver further includes a resistor having a resisting value similar to a characteristic impedance of the wiring section, and the resistor is coupled to the wiring section in parallel.

12. The motor controller of claim 11, wherein the driver further includes a capacitor coupled to the resistor in series.

13. The motor controller of claim 1, wherein the wiring section comprises one of twisted two cables and a pair of shielded twisted cables.

14. A motor controller including a position sensing device having a position sensor for sensing a magnetic pole of a motor, a driver for driving the motor, and a wiring section for feeding a power supply voltage from the driver into the position sensing device, wherein
the position sensing device comprises:
a superposed wave transmitter coupled to a first end of the wiring section;
a serial converter for converting a signal of the position sensor into a serial signal; and
a sensing-device interface disposed between the serial converter and the superposed wave transmitter,
the driver comprises:
a dc power supply;
a superposed wave receiver coupled between the dc power supply and a second end of the wiring section;
a parallel converter for converting the serial signal into a parallel signal;
a driver interface disposed between the superposed wave receiver and the parallel converter; and
a power switching circuit to be driven by the parallel signal,
wherein the serial signal is superposed to the wiring section and transmitted, and the power switching circuit switches a phase excitation for driving the motor, and
wherein the superposed-wave transmitter is equipped with a choke coil disposed on the sensing device side, coupled to a first end of the wiring section, and a coupling capacitor disposed on the sensing device side and coupled between the first end of the wiring section and the sensing-device interface, and
wherein the superposed-wave receiver is equipped with a choke coil disposed on the driver side, coupled between the dc power supply and a second end of the wiring section, and a coupling capacitor disposed on the driver side and coupled between the second end of the wiring section and the driver interface.

15. The motor controller of claim 14, wherein the sensing-device interface has a transmitting circuit, the driver interface has a receiving circuit, and the serial signal is transmitted from the sensing device to the driver in one direction.

16. The motor controller of claim 14,
wherein the sensing-device interface and the driver interface have respectively a transceiver, wherein the serial signal is transmitted from the sensing device to the driver, and a control signal for adjusting synchronization of communication is transmitted from the driver to the position sensing device.

17. The motor controller of claim 14, wherein the position sensing device further includes an A/D converter, and the signal of the position sensor is converted into a digital signal, then fed into the serial converter.

18. The motor controller of claim 17, wherein the position sensor is formed of three or two Hall elements, which are arranged at intervals of 120 degrees.

19. The motor controller of claim 17, wherein the position sensor is formed of two Hall elements, which are arranged at an interval of 90 degrees.

20. The motor controller of claim 14, wherein the position sensing device further includes a power incoming section, wherein the choke coil disposed on the position sensing device side is inserted between a positive side and a negative side in series between the wiring section and the power incoming section, wherein the power incoming section forms a power supply of the position sensing device.

21. The motor controller of claim 14, wherein the choke coil disposed on the driver side is inserted between a positive side and a negative side in series of the dc power supply.

22. The motor controller of claim 20, wherein the position sensing device further includes a capacitor coupled to the power incoming section in parallel.

23. The motor controller of claim 14, wherein the driver further includes a capacitor coupled to the dc power supply in parallel.

24. The motor controller of claim 14, wherein the driver further includes a resistor having a resisting value similar to a characteristic impedance of the wiring section, and the resistor is coupled to the wiring section in parallel.

25. The motor controller of claim 24, wherein the driver further includes a capacitor coupled to the resistor in series.

26. The motor controller of claim 14, wherein the wiring section comprises one of twisted two cables and a pair of shielded twisted cables.

27. A motor controller including a position sensing device having a position sensor for sensing a magnetic pole of a motor, a driver for driving the motor, and a wiring section for feeding a power supply voltage from the driver into the position sensing device, wherein
the position sensing device comprises:
a superposed wave transmitter coupled to a first end of the wiring section;
a serial converter for converting a signal of the position sensor into a serial signal; and
a sensing-device interface disposed between the serial converter and the superposed wave transmitter,
the driver comprises:
a dc power supply:
a superposed wave receiver coupled between the dc power supply and a second end of the wiring section;
a parallel converter for converting the serial signal into a parallel signal;
a driver interface disposed between the superposed wave receiver and the parallel converter; and
a power switching circuit to be driven by the parallel signal,
wherein the serial signal is superposed to the wiring section and transmitted, and the power switching circuit switches a phase excitation for driving the motor, and
wherein the superposed-wave transmitter is equipped with a choke coil disposed on the sensing device side, coupled to a first end of the wiring section, and a coupling capacitor disposed on the sensing device side and coupled between the first end of the wiring section and the sensing-device interface, and
wherein the superposed-wave receiver includes a driver transformer, and the transformer is equipped with a power supply wire-wound section coupled to a second end of the wiring section and a signal wire-wound section coupled to the driver interface.

28. The motor controller of claim 27, wherein the interface included in the sensing device has a transmitting circuit, the driver interface has a receiving circuit, and the serial signal is transmitted from the sensing device to the driver in one direction.

29. The motor controller of claim 27,
wherein the sensing-device interface and the driver interface have respectively a transceiver,
wherein the serial signal is transmitted from the sensing device to the driver, and a control signal for adjusting synchronization of communication is transmitted from the driver to the position sensing device.

30. The motor controller of claim 27, wherein the position sensing device further includes an A/D converter, and the signal of the position sensor is converted into a digital signal, then fed into the serial converter.

31. The motor controller of claim 30, wherein the position sensor is formed of three or two Hall elements, which are arranged at intervals of 120 degrees.

32. The motor controller of claim 30, wherein the position sensor is formed of two Hall elements, which are arranged at an interval of 90 degrees.

33. The motor controller of claim 27, wherein the position sensing device further includes a power incoming section, wherein the choke coil disposed on the position sensing device side is inserted between a positive side and a negative side in series between the wiring section and the power incoming section, wherein the power incoming section forms a power supply of the position sensing device.

34. The motor controller of claim 27, wherein the power supply wire-wound section of the driver transformer is inserted between a positive side and a negative side in series of the dc power supply.

35. The motor controller of claim 33, wherein the position sensing device further includes a capacitor coupled to the power incoming section in parallel.

36. The motor controller of claim 27, wherein the driver further includes a capacitor coupled to the dc power supply in parallel.

37. The motor controller of claim 27, wherein the driver further includes a resistor having a resisting value similar to a characteristic impedance of the wiring section, and the resistor is coupled to the wiring section in parallel.

38. The motor controller of claim 37, wherein the driver further includes a capacitor coupled to the resistor in series.

39. The motor controller of claim 27, wherein the wiring section comprises one of twisted two cables and a pair of shielded twisted cables.

40. A motor controller including a position sensing device having a position sensor for sensing a magnetic pole of a motor, a driver for driving the motor, and a wiring section for feeding a power supply voltage from the driver into the position sensing device, wherein
the position sensing device comprises:
a superposed wave transmitter coupled to a first end of the wiring section;
a serial converter for converting a signal of the position sensor into a serial signal; and a sensing-device interface disposed between the serial converter and the superposed wave transmitter,
the driver comprises:
a dc power supply;
a superposed wave receiver coupled between the dc power supply and a second end of the wiring section;
a parallel converter for converting the serial signal into a parallel signal;
a driver interface disposed between the superposed wave receiver and the parallel converter; and
a power switching circuit to be driven by the parallel signal;
wherein the serial signal is superposed to the wiring section and transmitted, and the power switching circuit switches a phase excitation for driving the motor, and
wherein the superposed-wave transmitter includes a sensing-device transformer, which is equipped with a power supply wire-wound section coupled to a first end of the wiring section, and a signal wire-wound section coupled to the sensing device interface, and
wherein the superposed-wave receiver is equipped with a choke coil disposed on the driver side, coupled between the dc power supply and a second end of the wiring section, and a coupling capacitor disposed on the driver side and coupled between the second end of the wiring section and the driver interface.

41. The motor controller of claim 40, wherein the sensing-device interface has a transmitting circuit, the driver interface has a receiving circuit, and the serial signal is transmitted from the sensing device to the driver in one direction.

42. The motor controller of claim 40,
wherein the sensing-device interface and the driver interface have respectively a transceiver,
wherein the serial signal is transmitted from the sensing device to the driver, and a control signal for adjusting synchronization of communication is transmitted from the driver to the position sensing device.

43. The motor controller of claim 40, wherein the position sensing device further includes an A/D converter, and the signal of the position sensor is converted into a digital signal, then fed into the serial converter.

44. The motor driver of claim 43, wherein the position sensor is formed of three or two Hall elements, which are arranged at intervals of 120 degrees.

45. The motor driver of claim 43, wherein the position sensor is formed of two Hall elements, which are arranged at an interval of 90 degrees.

46. The motor controller of claim 40, wherein the position sensing device further includes a power incoming section, wherein the power supply wire-wound section of the sensing-device transformer is inserted between a positive side and a negative side in series between the wiring section and the power incoming section, wherein the power incoming section forms a power supply of the position sensing device.

47. The motor controller of claim 40, wherein the choke coil disposed on the driver side is inserted between a positive side and a negative side in series of the dc power supply.

48. The motor controller of claim 46, wherein the position sensing device further includes a capacitor coupled to the power incoming section in parallel.

49. The motor controller of claim 40, wherein the driver further includes a capacitor coupled to the dc power supply in parallel.

50. The motor controller of claim 40, wherein the driver further includes a resistor having a resisting value similar to a characteristic impedance of the wiring section, and the resistor is coupled to the wiring section in parallel.

51. The motor controller of 50, wherein the driver further includes a capacitor coupled to the resistor in series.

52. The motor controller of claim 40, wherein the wiring section comprises one of twisted two cables and a pair of shielded twisted cables.

* * * * *

UNITED STATES PATENT AND TRADEMARK OFFICE
CERTIFICATE OF CORRECTION

PATENT NO. : 6,987,368 B2  
DATED : January 17, 2006  
INVENTOR(S) : Yamasaki et al.

It is certified that error appears in the above-identified patent and that said Letters Patent is hereby corrected as shown below:

<u>Title page,</u>
Item [56], References Cited, FOREIGN PATENT DOCUMENTS,
"JP 05-119020" should read -- JP 06-119020 --.

Signed and Sealed this

Twenty-third Day of May, 2006

JON W. DUDAS
*Director of the United States Patent and Trademark Office*